(12) United States Patent
Kinoshita

(10) Patent No.: US 11,687,099 B2
(45) Date of Patent: Jun. 27, 2023

(54) BOAT AND TRIM ANGLE CONTROL METHOD FOR BOAT

(71) Applicant: YAMAHA HATSUDOKI KABUSHIKI KAISHA, Iwata (JP)

(72) Inventor: Yoshimasa Kinoshita, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 156 days.

(21) Appl. No.: 17/063,738

(22) Filed: Oct. 6, 2020

(65) Prior Publication Data

US 2021/0141396 A1  May 13, 2021

(30) Foreign Application Priority Data

Nov. 7, 2019 (JP) .................... 2019-202505

(51) Int. Cl.
G05D 1/08 (2006.01)
B63H 21/14 (2006.01)
B63H 11/00 (2006.01)
B63H 21/21 (2006.01)
B63H 11/113 (2006.01)
B63B 34/10 (2020.01)

(52) U.S. Cl.
CPC ........... *G05D 1/0875* (2013.01); *B63H 11/00* (2013.01); *B63H 11/113* (2013.01); *B63H 21/14* (2013.01); *B63H 21/21* (2013.01); *B63B 34/10* (2020.02); *B63H 2021/216* (2013.01)

(58) Field of Classification Search
CPC ....... B63H 11/00; B63H 11/113; B63H 21/14; B63H 21/21; G05D 1/0875
See application file for complete search history.

(56) References Cited

U.S. PATENT DOCUMENTS

| | | | | |
|---|---|---|---|---|
| 7,841,915 B2* | 11/2010 | Bourret | ............... | B63H 11/107 440/41 |
| 9,751,605 B1* | 9/2017 | Anschuetz | ............ | B63H 21/21 |
| 9,919,781 B1* | 3/2018 | Andrasko | ............... | B63B 79/10 |
| 9,926,062 B2* | 3/2018 | Anma | .................... | B63H 23/08 |
| 10,118,682 B2* | 11/2018 | Anschuetz | ............ | B63H 20/10 |
| 10,829,190 B1* | 11/2020 | Pugh | ..................... | B63H 20/10 |
| 2008/0133075 A1* | 6/2008 | St-Pierre | ............... | B63H 11/08 701/21 |

FOREIGN PATENT DOCUMENTS

JP  5599480 B2 * 10/2014  ............ B63H 11/08
JP  5599480 B2   10/2014

* cited by examiner

*Primary Examiner* — S. Joseph Morano
*Assistant Examiner* — Jovon E Hayes
(74) *Attorney, Agent, or Firm* — Keating and Bennett, LLP

(57) ABSTRACT

A boat includes a propulsion device that generates, by driving of an engine, a propulsive force to propel a boat body, a trim changer that changes a trim angle of the boat body, a trim actuator that drives the trim changer, and a controller configured or programmed to control operation of the trim actuator based on a value corresponding to a change in a boat speed.

20 Claims, 9 Drawing Sheets

BOAT AND TRIM ANGLE CONTROL METHOD FOR BOAT

CROSS REFERENCE TO RELATED APPLICATIONS

This application claims the benefit of priority to Japanese Patent Application No. 2019-202505 filed on Nov. 7, 2019. The entire contents of this application are hereby incorporated herein by reference.

BACKGROUND OF THE INVENTION

1. Field of the Invention

The present invention relates to a boat including a trim changer that changes the trim angle of a boat body and a trim angle control method for a boat.

2. Description of the Related Art

A boat including a trim changer that changes the trim angle of a boat body and a trim angle control method for a boat are known in general. Such a boat control system is disclosed in Japanese Patent No. 5599480, for example.

Japanese Patent No. 5599480 discloses an automatic trim system for a jet propelled boat. This automatic trim system includes a steering angle sensor that detects the steering angle of a steering, a control electronic device, a movable actuator, and a motion transmission. The control electronic device sets a target for the trim angle based on the steering angle detected by the steering angle sensor. The control electronic device sets a target for the trim angle such that the trim angle decreases as the steering angle increases. The automatic trim system changes the trim angle of the jet propelled boat with the motion transmission by controlling the movable actuator based on the target setting.

The automatic trim system disclosed in Japanese Patent No. 5599480 includes the steering angle sensor to automatically control the trim angle. Therefore, in the automatic trim system disclosed in Japanese Patent No. 5599480, the structure of the automatic trim system (boat) becomes complex in order to automatically control the trim angle of the jet propelled boat (boat body).

SUMMARY OF THE INVENTION

Preferred embodiments of the present invention provide boats and trim angle control methods for boats that each automatically control the trim angles of boat bodies while significantly reducing or preventing complex structures.

A boat according to a preferred embodiment of the present invention includes an engine, a propulsion device to generate, by driving of the engine, a propulsive force to propel a boat body, a trim changer to change a trim angle of the boat body, a trim actuator to drive the trim changer, and a controller configured or programmed to control operation of the trim actuator based on a value corresponding to a change in a boat speed.

In a boat according to a preferred embodiment of the present invention, the controller is configured or programmed to control the operation of the trim actuator based on the value corresponding to the change in the boat speed. The value corresponding to the change in the boat speed is acquired by an existing detector provided in the boat. In view of this point, according to a preferred embodiment of the present invention, the controller is configured or programmed to control the operation of the trim actuator based on the value corresponding to the change in the boat speed such that the trim angle of the boat body is automatically controlled without newly providing a steering angle sensor in a steering. Consequently, the trim angle of the boat body is automatically controlled while a complex structure of the boat is significantly reduced or prevented.

When the trim angle is adjusted such that the trim angle decreases as the steering angle increases as in the related art, the trim angle of the boat conceivably decreases after a time at which the steering operation is performed (after the boat starts to turn). In other words, the trim angle of the boat conceivably has not decreased yet or the amount of decrease in the trim angle is conceivably still small at a time at which the boat starts to turn. Therefore, the boat conceivably starts to turn in a state in which a contact area between the boat body (hull) and the water surface is relatively small. Consequently, with a conventional control method, the water contact resistance of the boat conceivably decreases, and the turning diameter of the boat conceivably increases (the time required for the boat to turn conceivably increases). In this regard, according to a preferred embodiment of the present invention, the controller is configured or programmed to control the operation of the trim actuator based on the value corresponding to the change in the boat speed to control the trim angle of the boat based on the change in the boat speed (acceleration or deceleration), as described above. Therefore, the trim angle of the boat is controlled based on deceleration of the boat before the boat starts to turn, for example. Consequently, the trim angle is decreased before the boat starts to turn, and thus the trim angle of the boat is sufficiently small at a time at which the boat starts to turn. Accordingly, the boat starts to turn in a state in which a contact area between the boat body (hull) and the water surface is relatively large. Thus, the water contact resistance of the boat is increased, and an increase in the turning diameter of the boat (an increase in the time required for the boat to turn) is significantly reduced or prevented.

In a boat according to a preferred embodiment of the present invention, the controller is preferably configured or programmed to acquire, as the value corresponding to the change in the boat speed, at least one of an amount of change in a rotational speed of the engine or a throttle opening of the engine, and to control the operation of the trim actuator based on at least one of the amount of change in the rotational speed of the engine or the throttle opening of the engine, i.e., (i) the amount of change in the rotational speed of the engine, or (ii) the throttle opening of the engine, or (iii) the amount of change in the rotational speed of the engine and the throttle opening of the engine. Generally, a boat includes a detector that acquires at least one of the rotational speed of the engine or the throttle opening of the engine. In view of this point, according to a preferred embodiment of the present invention, the controller acquires at least one of the amount of change in the rotational speed of the engine or the throttle opening of the engine as the value corresponding to the change in the boat speed, and thus the trim angle of the boat body is automatically controlled without newly providing a steering angle sensor in a steering for the boat. Furthermore, the amount of change in the rotational speed of the engine and the throttle opening of the engine are acquired, and thus the value corresponding to the change in the boat speed is easily acquired.

In a boat according to a preferred embodiment of the present invention, the controller is preferably configured or programmed to control the operation of the trim actuator so as to change an orientation of the trim changer to a deceleration orientation based on the value corresponding to the change in the boat speed entering into a condition corresponding to deceleration of the boat body. Accordingly, before the boat turns, the orientation of the trim changer is changed to the deceleration orientation based on the deceleration of the boat body occurring before turning of the boat. Consequently, an increase in the turning diameter of the boat (an increase in the time required for the boat to turn) is effectively significantly reduced or prevented.

In such a case, the controller is preferably configured or programmed to control the operation of the trim actuator so as to change the orientation of the trim changer from the deceleration orientation to an acceleration orientation based on the value corresponding to the change in the boat speed entering into a condition corresponding to stopping of the deceleration of the boat body when operating the trim actuator to change the orientation of the trim actuator to the deceleration orientation. When the boat starts to accelerate while turning after decelerating and starting to turn, the boat more quickly accelerates when the trim changer of the boat body is oriented in the acceleration orientation (upward relative to the deceleration orientation, for example) different from the deceleration direction. According to a preferred embodiment of the present invention, the orientation of the trim changer is changed from the deceleration orientation to the acceleration orientation based on the value corresponding to the change in the boat speed entering into the condition corresponding to the stopping of the deceleration of the boat body such that the orientation of the trim changer is changed to the acceleration orientation when the boat starts to accelerate while turning, and thus the boat more quickly accelerates after decelerating and then accelerating.

In a boat that changes the orientation of the trim changer to the deceleration orientation based on the value corresponding to the change in the boat speed entering into the condition corresponding to the deceleration of the boat body, the controller is preferably configured or programmed to control the operation of the trim actuator so as to change the orientation of the trim changer to the deceleration orientation based on the value corresponding to the change in the boat speed being a value corresponding to the deceleration of the boat body continuously for a first period of time as the condition corresponding to the deceleration of the boat body. When the orientation of the trim changer is immediately changed to the deceleration orientation at a time at which the boat body decelerates, the trim angle is conceivably changed at an earlier time than necessary. In this regard, according to a preferred embodiment of the present invention, the orientation of the trim changer is changed to the deceleration orientation based on the value corresponding to the change in the boat speed being the value corresponding to the deceleration of the boat body continuously for the first period of time. Accordingly, the orientation of the trim changer is changed to the deceleration orientation at a more appropriate time than a time at which the boat body decelerates. In addition, the orientation of the trim changer is not changed until the first period of time elapses, and thus a frequent change in the orientation of the trim changer (the occurrence of chattering) is significantly reduced or prevented.

In a boat that changes the orientation of the trim changer to the deceleration orientation based on the value corresponding to the change in the boat speed being the value corresponding to the deceleration of the boat body continuously for the first period, the controller is preferably configured or programmed to control the operation of the trim actuator so as to change the orientation of the trim changer to the deceleration orientation based on the value corresponding to the change in the boat speed being the value corresponding to the deceleration of the boat body continuously for the first period of time from a time before turning of the boat body as the condition corresponding to the deceleration of the boat body. Accordingly, the orientation of the trim changer is changed to the deceleration orientation at a more appropriate time (at a time at which the first period of time has elapsed) after a time at which the boat body decelerates. Furthermore, the orientation of the trim changer is not changed until the first period of time elapses after the deceleration, and thus a frequent change in the orientation of the trim changer (the occurrence of chattering) is significantly reduced or prevented.

In a boat that changes the orientation of the trim changer to the deceleration orientation based on the value corresponding to the change in the boat speed entering into the condition corresponding to the deceleration of the boat body, the controller is preferably configured or programmed to control the operation of the trim actuator so as to change the orientation of the trim changer to the deceleration orientation when a value corresponding to the boat speed is a value corresponding to a high speed and the value corresponding to the change in the boat speed enters into the condition corresponding to the deceleration of the boat body. When the boat decelerates to turn from a state in which the boat is traveling at a high speed, the turning diameter is likely to be relatively large. In this regard, according to a preferred embodiment of the present invention, the orientation of the trim changer is changed to the deceleration orientation when the value corresponding to the boat speed is the value corresponding to the high speed and the value corresponding to the change in the boat speed enters into the condition corresponding to the deceleration of the boat body, and thus when the turning diameter is likely to be relatively large, the trim angle is effectively controlled so as to significantly reduce or prevent an increase in the turning diameter.

In a boat that changes the orientation of the trim changer to the deceleration orientation based on the value corresponding to the change in the boat speed entering into the condition corresponding to the deceleration of the boat body, the controller is preferably configured or programmed to control the operation of the trim actuator so as to change the orientation of the trim changer from the deceleration orientation to a low-speed orientation based on a value corresponding to the boat speed becoming a value corresponding to a low speed or the engine entering an idle state when operating the trim actuator to change the orientation of the trim changer to the deceleration orientation. Accordingly, the orientation of the trim changer is changed to the low-speed orientation different from the deceleration orientation when the boat is traveling at a low speed or when the boat is stopped. Consequently, the orientation of the trim changer is controlled such that the trim angle is appropriate even when the boat is traveling at a low speed or when the boat is stopped.

In a boat that changes the orientation of the trim changer from the deceleration orientation to the low-speed orientation based on the value corresponding to the boat speed becoming the value corresponding to the low speed or the engine entering the idle state, the controller is preferably configured or programmed to control the operation of the trim actuator so as to change the orientation of the trim changer from the deceleration orientation to the low-speed orientation based on the value corresponding to the boat speed being the value corresponding to the low speed continuously for a second period of time or the engine being in the idle state continuously for the second period of time when operating the trim actuator to change the orientation of the trim changer to the deceleration orientation. After decelerating, the boat may travel at a low speed without accelerating, or the boat may accelerate. Therefore, when the boat decelerates and then accelerates to turn, for example, the orientation of the trim changer may conceivably be unsuitable for acceleration of the boat when the orientation of the trim changer is immediately changed to the low-speed orientation in response to the value corresponding to the boat speed becoming the value corresponding to the low speed or the engine entering the idle state. In this regard, according to a preferred embodiment of the present invention, the orientation of the trim changer is changed from the deceleration orientation to the low-speed orientation based on the value corresponding to the boat speed being the value corresponding to the low speed continuously for the second period of time or the engine being in the idle state continuously for the second period of time. Accordingly, the orientation of the trim changer is not immediately changed in response to the value corresponding to the boat speed becoming the value corresponding to the low speed or the engine entering the idle state. Consequently, when the boat decelerates and then accelerates, the trim changer is oriented in an appropriate orientation. In addition, the orientation of the trim changer is not changed until the second period elapses, and thus a frequent change in the orientation of the trim changer (the occurrence of chattering) is significantly reduced or prevented.

In a boat according to a preferred embodiment of the present invention, the controller is preferably configured or programmed to control the operation of the trim actuator so as to change an orientation of the trim changer to an acceleration orientation based on the value corresponding to the change in the boat speed entering into a condition corresponding to acceleration of the boat body. Accordingly, the trim angle of the boat body is easily changed to the trim angle of the boat body suitable for when the boat accelerates. Consequently, when the boat accelerates after turning, for example, the trim angle of the boat body is appropriately and automatically controlled.

In such a case, the controller is preferably configured or programmed to control the operation of the trim actuator so as to change the orientation of the trim changer to the acceleration orientation based on the value corresponding to the change in the boat speed being a value corresponding to the acceleration of the boat body continuously for a third period of time as the condition corresponding to the acceleration of the boat body. Although the boat starts to accelerate during turning when turning, the trim changer of the boat is oriented in the deceleration orientation rather than the acceleration orientation during turning such that an increase in the turning diameter is significantly reduced or prevented. In view of this point, according to a preferred embodiment of the present invention, the orientation of the trim changer is changed to the acceleration orientation based on the value corresponding to the change in the boat speed being the value corresponding to the acceleration of the boat body continuously for the third period of time such that the orientation of the trim changer is changed to the acceleration orientation after the boat starts to accelerate and the third period of time elapses. Consequently, the trim angle of the boat body is automatically controlled to be suitable for acceleration while an increase in the turning diameter is significantly reduced or prevented. Furthermore, the orientation of the trim changer is not changed until the third period of time elapses, and thus a frequent change in the orientation of the trim changer (the occurrence of chattering) is significantly reduced or prevented.

In a boat that changes the orientation of the trim changer to the acceleration orientation based on the value corresponding to the change in the boat speed being the value corresponding to the acceleration of the boat body continuously for the third period of time, the controller is preferably configured or programmed to control the operation of the trim actuator so as to change the orientation of the trim changer to the acceleration orientation based on the value corresponding to the change in the boat speed being the value corresponding to the acceleration of the boat body continuously for the third period of time after turning of the boat body is completed as the condition corresponding to the acceleration of the boat body. Accordingly, the orientation of the trim changer is changed to the acceleration orientation after turning of the boat body is completed and the third period of time elapses from a time at which the acceleration is started, and thus an increase in the turning diameter due to a change in the orientation of the trim changer during turning of the boat body is significantly reduced or prevented.

In a boat that changes the orientation of the trim changer to the acceleration orientation based on the value corresponding to the change in the boat speed entering into the condition corresponding to the acceleration of the boat body, the controller is preferably configured or programmed to control the operation of the trim actuator so as to change the orientation of the trim changer to a deceleration orientation based on the value corresponding to the change in the boat speed entering into a condition corresponding to deceleration of the boat body, and to control the operation of the trim actuator so as to change the orientation of the trim changer to the acceleration orientation based on the value corresponding to the change in the boat speed entering into the condition corresponding to the acceleration of the boat body when operating the trim actuator to change the orientation of the trim changer to the deceleration orientation. Accordingly, the orientation of the trim changer is changed to the orientation of the trim changer suitable for when the boat decelerates and then accelerates. Consequently, when the boat decelerates and then accelerates to turn, for example, the orientation of the trim changer is changed to an appropriate orientation from the start of turning to the end of turning.

In a boat according to a preferred embodiment of the present invention, the controller is preferably configured or programmed to control the operation of the trim actuator based on a value corresponding to the boat speed and the value corresponding to the change in the boat speed so as to change an orientation of the trim changer to an orientation corresponding to any one of a high-speed state in which the boat speed is high, a deceleration state in which the boat speed is reducing from a high speed, and a low-speed state in which the boat speed is low. Accordingly, the orientation of the trim changer is changed to an appropriate orientation for the high-speed state, the deceleration state, or the low-speed state.

In such a case, the controller is preferably configured or programmed to control the operation of the trim actuator so as to change the orientation of the trim changer from the orientation corresponding to the high-speed state to the orientation corresponding to the deceleration state based on a throttle opening of the engine as the value corresponding to the change in the boat speed entering into a condition corresponding to deceleration of the boat body in the high-speed state. Accordingly, the throttle opening of the engine is acquired such that a change from the high-speed state to the deceleration state is easily detected.

In a boat that changes the orientation of the trim changer to the orientation corresponding to any one of the high-speed state, the deceleration state, and the low-speed state, the controller is preferably configured or programmed to perform a control to perform a filtering process on a rotational speed of the engine as the value corresponding to the boat speed in the deceleration state, and to control the operation of the trim actuator so as to change the orientation of the trim changer from the orientation corresponding to the low-speed state to the orientation corresponding to the high-speed state based on the rotational speed of the engine becoming a value corresponding to the high speed after the filtering process. Accordingly, the filtering process is performed on the rotational speed of the engine such that unnecessary frequency components are removed from information about the rotational speed of the engine. Consequently, an erroneous change of the orientation of the trim changer to the orientation corresponding to the high-speed state based on a value of the rotational speed of the engine that varies instantaneously due to unnecessary frequency components such as noise is significantly reduced or prevented.

In a boat that changes the orientation of the trim changer to the orientation corresponding to any one of the high-speed state, the deceleration state, and the low-speed state, the orientation corresponding to the high-speed state is preferably set as the orientation of the trim changer directed upward relative to the orientation corresponding to the low-speed state, the orientation corresponding to the deceleration state is preferably set as the orientation of the trim changer directed downward relative to the orientation corresponding to the high-speed state, and the orientation corresponding to the low-speed state is preferably set as the orientation of the trim changer directed upward relative to the orientation corresponding to the deceleration state. Accordingly, in the high-speed state, the trim angle of the boat body is larger than that in the low-speed state, and thus the water contact resistance of the boat body is decreased. Furthermore, in the deceleration state, the trim angle is smaller than that in the high-speed state, and thus an increase in attitude change that occurs during deceleration is significantly reduced or prevented. In the low-speed state, the trim angle is larger than that in the deceleration state, and thus an excessive reduction in the trim angle is significantly reduced or prevented in the low-speed state.

A trim angle control method for a boat including a trim changer that changes a trim angle of a boat body and a trim actuator that drives the trim changer according to a preferred embodiment of the present invention includes acquiring a value corresponding to a change in a boat speed, and changing the trim angle of the boat body by controlling operation of the trim actuator based on the value corresponding to the change in the boat speed.

A trim angle control method for a boat according to a preferred embodiment of the present invention as described above enables the trim angle of the boat body to be automatically controlled while a complex structure is significantly reduced or prevented. Furthermore, a trim angle control method for a boat according to a preferred embodiment of the present invention as described above significantly reduces or prevents an increase in the turning diameter of the boat (an increase in the time required for the boat to turn).

In a trim angle control method for a boat according to a preferred embodiment of the present invention, the acquiring of the value corresponding to the change in the boat speed preferably includes acquiring at least one of an amount of change in a rotational speed of an engine or a throttle opening of the engine, and the changing of the trim angle of the boat body preferably includes controlling the operation of the trim actuator based on at least one of the amount of change in the rotational speed of the engine or the throttle opening of the engine. Accordingly, the trim angle of the boat body is automatically controlled without newly providing a steering angle sensor in a steering for the boat. Furthermore, the amount of change in the rotational speed of the engine and the throttle opening of the engine are acquired, and thus the value corresponding to the change in the boat speed is easily acquired.

In a trim angle control method for a boat according to a preferred embodiment of the present invention, the changing of the trim angle of the boat body preferably includes controlling the operation of the trim actuator so as to change an orientation of the trim changer to a deceleration orientation based on the value corresponding to the change in the boat speed entering into a condition corresponding to deceleration of the boat body. Accordingly, before the boat turns, the orientation of the trim changer is changed to the deceleration orientation based on the deceleration of the boat body occurring before turning of the boat. Consequently, an increase in the turning diameter of the boat (an increase in the time required for the boat to turn) is effectively significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a boat 100 according to a first preferred embodiment of the present invention is now described with reference to FIGS. 1 to 7. The boat 100 is a personal watercraft (PWC), for example, and is a water jet propelled boat. That is, the boat 100 is a straddled watercraft. In the following description, the term "front (forward)" refers to a direction indicated by "FWD" in FIG. 1, and the term "rear (rearward)" refers to a direction indicated by "BWD" in FIG. 1.

Figure 1:
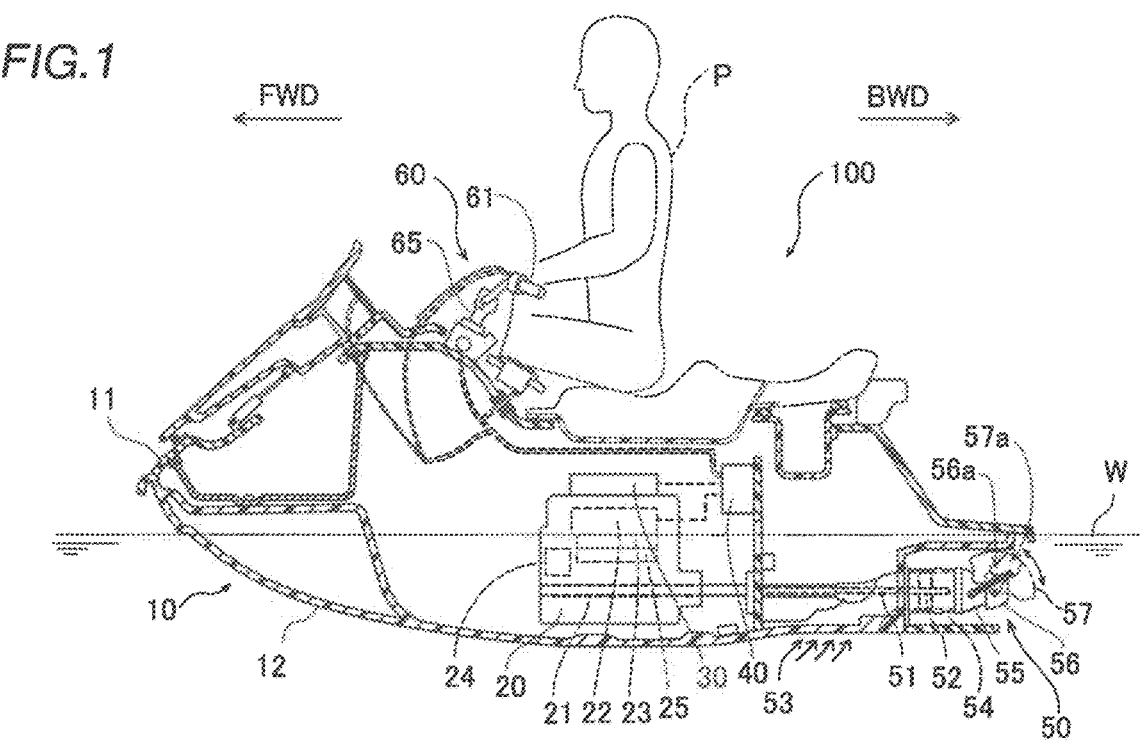
FIG. 1 is a sectional view schematically showing a boat according to a first preferred embodiment of the present invention.

As shown in FIG. 1, the boat 100 includes a hull 10, an engine 20, a fuel injection system 30 (hereinafter referred to as an "FI system 30"), a controller 40, a propulsion mechanism 50, and a steering unit 60.

The boat body 10 includes a deck 11 and a hull 12. The engine 20, the FI system 30, and the controller 40 are disposed inside the boat body 10.

The engine 20 obtains a driving force to rotate a crankshaft 21 by combustion of a mixture of air and fuel in a combustion chamber. The engine 20 includes a throttle valve 22 and a throttle valve actuator 23 (hereinafter referred to as an "actuator 23"). The actuator 23 changes the opening of the throttle valve 22 such that the throttle valve 22 adjusts the amount of air supplied to the combustion chamber of the engine 20. As the opening of the throttle valve 22 (throttle opening A) increases, the rotational speed of the engine 20 (engine rotational speed Ne) increases. The engine rotational speed Ne is an example of a "value corresponding to the boat speed". The throttle opening A is an example of a "value corresponding to a change in a boat speed".

The boat 100 includes an engine rotational speed sensor 24 and a throttle opening sensor 25. The engine rotational speed sensor 24 detects the rotational speed of the engine 20 (crankshaft 21) (engine rotational speed Ne) and transmits information (detection signal) about the engine rotational speed Ne to the controller 40. Furthermore, the throttle opening sensor 25 detects the throttle opening A and transmits information (detection signal) about the throttle opening A to the controller 40.

Figure 2:
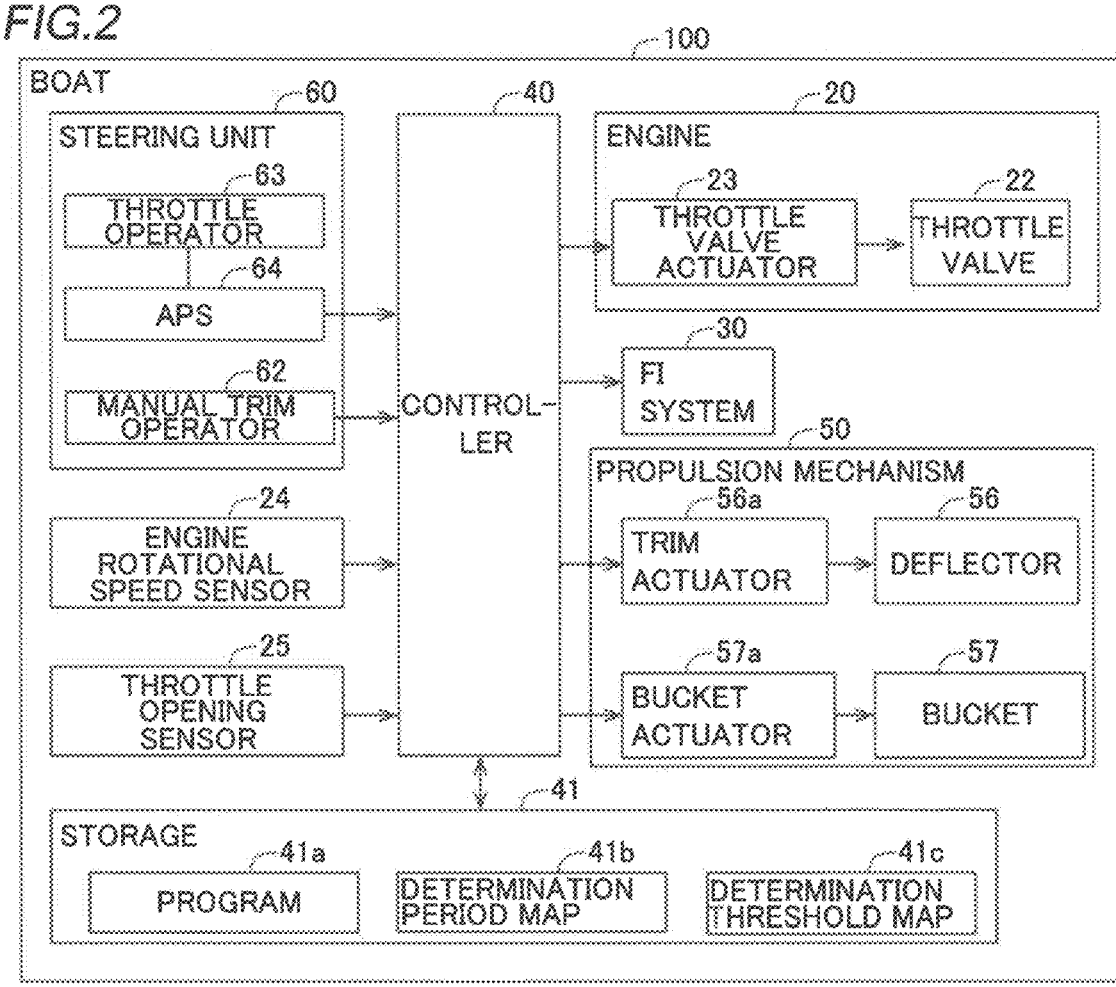
FIG. 2 is a block diagram showing the structure of the boat according to the first preferred embodiment of the present invention.

The controller 40 includes an engine control unit including a control circuit such as a central processing unit (CPU), for example. As shown in FIG. 2, the boat 100 includes a storage 41 that stores a program 41a, a determination period map 41b, and a determination threshold map 41c. The controller 40 is configured or programmed to execute a control process described below based on the program 41a, the determination period map 41b, and the determination threshold map 41c stored in the storage 41. The storage 41 includes a non-volatile memory, for example.

As shown in FIG. 1, the propulsion mechanism 50 generates, by driving of the engine 20, a propulsive force to propel the boat body 10. The propulsion mechanism 50 is a water jet propulsion device, for example. The propulsion mechanism 50 includes an impeller shaft 51, an impeller 52, a water intake 53, an impeller housing 54, a nozzle 55, a deflector 56, and a bucket 57. The propulsion mechanism 50 is an example of a "propulsion device". The deflector 56 is an example of a "trim changer".

The impeller shaft 51 is connected to the crankshaft 21. The impeller 52 is provided adjacent to or in the vicinity of a rear end of the impeller shaft 51. The impeller 52 is disposed inside the impeller housing 54 connected to a rear portion of the water intake 53, suctions water below the water surface W from the water intake 53, and jets the water rearward from the nozzle 55 provided rearward of the impeller housing 54.

The deflector 56 is disposed rearward of the nozzle 55, and changes the direction of the water jetted rearward from the nozzle 55 to a right-left direction. The steering unit 60 (a pair of grips 61) is operated such that the orientation of the deflector 56 in the right-left direction is changed. The orientation of the deflector 56 in the right-left direction is changed such that the boat 100 is steered.

Figure 3:
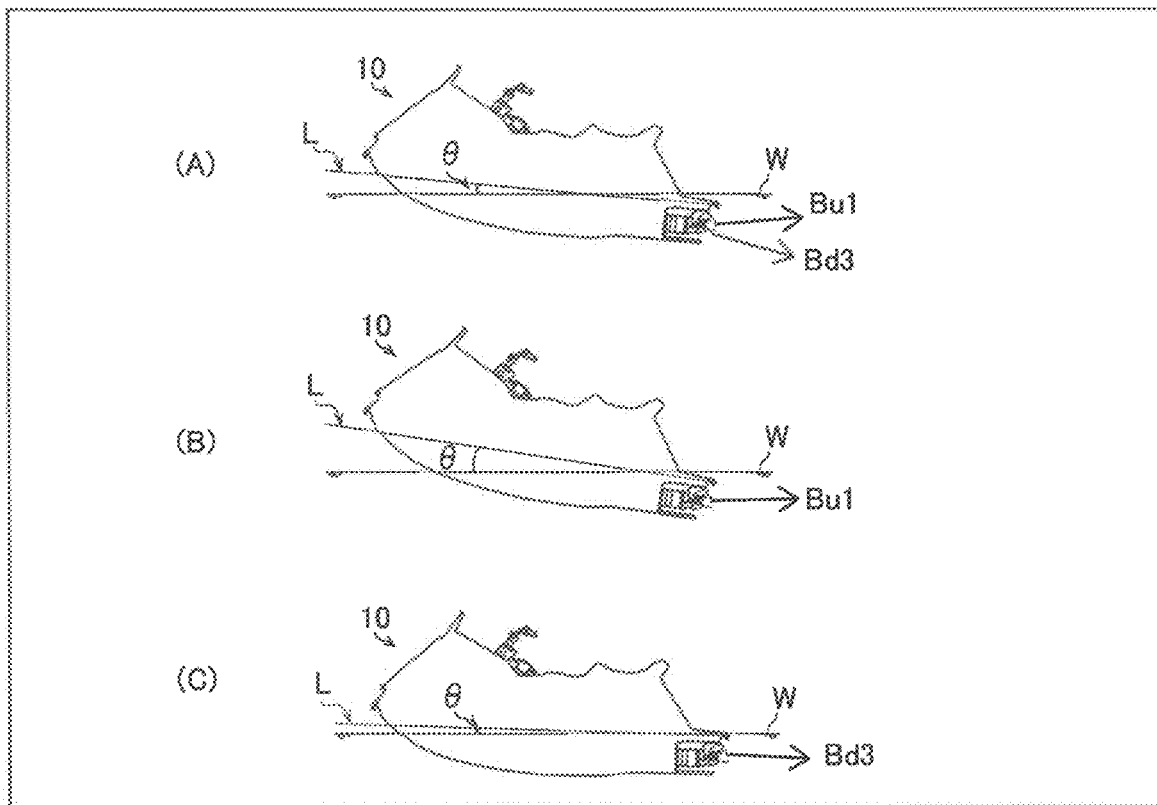
FIG. 3 is a diagram illustrating a relationship between the orientation and the trim angle of a deflector according to the first preferred embodiment of the present invention.

As shown in FIG. 3, the deflector 56 changes the direction of the water jetted rearward to an upward-downward direction. The deflector 56 changes the direction of the water jetted rearward to the upward-downward direction to change the trim angle θ of the boat body 10. That is, the orientation B of the deflector 56 is changed such that the trim angle θ of the boat body 10 is changed. For example, when the orientation B of the deflector 56 is raised from the state shown in (A) of FIG. 3 to an orientation Bu1, the trim angle θ increases as shown in (B) of FIG. 3, and when the orientation B of the deflector 56 is lowered to an orientation Bd3, the trim angle θ decreases as shown in (C) of FIG. 3. In this specification, the term "trim" refers to a difference between the bow draft and the stern draft, and the term "trim angle θ" refers to an angle defined by the water surface W (draft line) and a line segment L that connects the bow to the stern.

Figure 4:
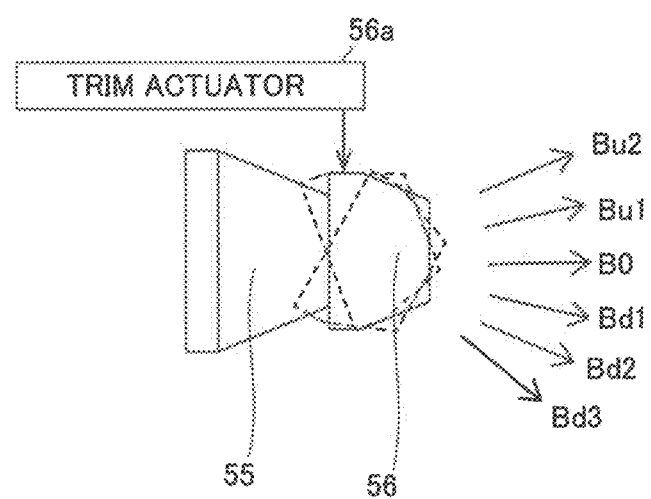
FIG. 4 is a diagram illustrating the orientation of the deflector according to the first preferred embodiment of the present invention.

The boat 100 includes a trim actuator 56a connected to the deflector 56. The trim actuator 56a changes the orientation B of the deflector 56 (drives the deflector 56) according to a command from the controller 40. For example, as shown in FIG. 4, the deflector 56 is changeable to a total of six levels including orientations Bu2, Bu1, B0, Bd1, Bd2, and Bd3 from an orientation B (Bu2) in which the trim angle θ of the boat body 10 is maximized (the bow is most raised) to an orientation B (Bd3) in which the trim angle θ of the boat body 10 is minimized (the bow is most lowered). The trim actuator 56a changes the orientation B of the deflector 56 among the orientations Bu2, Bu1, B0, Bd1, Bd2, and Bd3.

The bucket 57 is movable between the upper side and the rear side of the deflector 56 by a bucket actuator 57a. The bucket 57 changes the direction of the water jetted rearward from the nozzle 55 and the deflector 56 to a forward direction when the bucket 57 is moved to the rear side of the deflector 56. Driving of the bucket actuator 57a is controlled by the controller 40.

The steering unit 60 includes a manual trim operator 62, a throttle operator 63 (a lever, for example) that operates the throttle opening A, an accelerator position sensor (APS) 64, a pair of grips 61, and a steering shaft 65 (see FIG. 1) that rotates integrally with the pair of grips 61. The APS 64 detects the operation amount of the throttle operator 63 (the rotation angle of the lever, for example) and transmits a detection signal (information about the operation amount) to the controller 40. The manual trim operator 62 transmits an input operation by a rider P to the controller 40. The controller 40 is configured or programmed to operate the trim actuator 56a so as to change the orientation B of the deflector 56 among the orientations Bu2, Bu1, B0, Bd1, Bd2, and Bd3 based on the input operation to the manual trim operator 62.

The controller 40 is configured or programmed to control the operation of the trim actuator 56a based on the deviation $\Delta TH$ of the throttle opening A (hereinafter referred to as a "throttle opening deviation $\Delta TH$"). That is, the controller 40 is configured or programmed to acquire the throttle opening deviation $\Delta TH$ based on the throttle opening A acquired from the throttle opening sensor 25. The controller 40 is configured or programmed to control the operation of the trim actuator 56a based on the throttle opening deviation $\Delta TH$ so as to change the orientation B of the deflector 56 and change the trim angle $\theta$ of the boat body 10.

In the first preferred embodiment, the controller 40 is configured or programmed to change the trim angle $\theta$ by changing the orientation B of the deflector 56 based on the engine rotational speed Ne in addition to the throttle opening deviation $\Delta TH$. Specifically, the controller 40 is configured or programmed to control the operation of the trim actuator 56a so as to change the orientation B of the deflector 56 to an orientation corresponding to one of a high-speed state M1 in which the boat speed is high, a deceleration state M2 in which the boat speed is reducing from the high speed, and a low-speed state M3 in which the boat speed is low, based on the engine rotational speed Ne and the throttle opening deviation $\Delta TH$.

The "low speed" described above is a speed of 2 km/h (trolling speed) or more and less than 10 km/h, for example. The "high speed" described above is a speed of 10 km/h or more (a speed higher than the low speed), for example.

In the first preferred embodiment, the orientation B of the deflector 56 corresponding to the high-speed state M1 is set to the orientation Bu1 directed upward relative to the orientation B of the deflector 56 corresponding to the low-speed state M3. The orientation B of the deflector 56 corresponding to the deceleration state M2 is set to the orientation Bd3 directed downward relative to the orientation B of the deflector 56 corresponding to the high-speed state M1. The orientation B of the deflector 56 corresponding to the low-speed state M3 is set to the orientation Bd2 directed upward relative to the orientation B of the deflector 56 corresponding to the deceleration state M2. The orientation Bu1 of the deflector 56 corresponding to the high-speed state M1 is an example of an "acceleration orientation". The orientation Bd3 of the deflector 56 corresponding to the deceleration state M2 is an example of a "deceleration orientation". The orientation Bd2 of the deflector 56 corresponding to the low-speed state M3 is an example of a "low-speed orientation".

Figure 5:
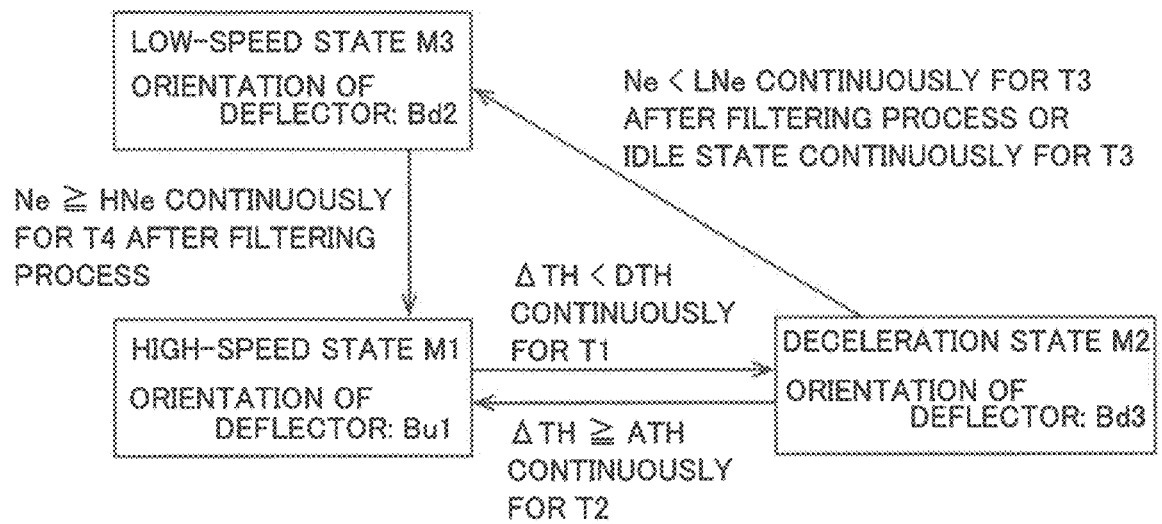
FIG. 5 is a diagram illustrating a change in the orientation of the deflector according to the first preferred embodiment of the present invention.
Figure 6:
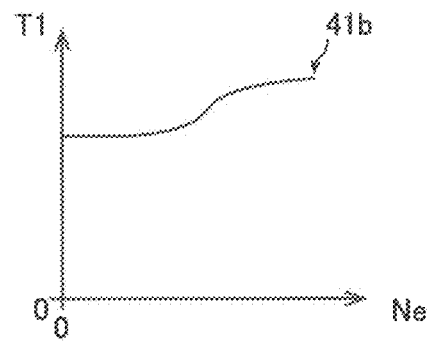
FIG. 6 is a diagram illustrating a determination time map according to the first preferred embodiment of the present invention.
Figure 7:
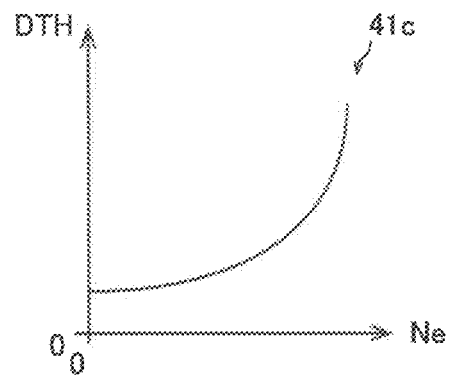
FIG. 7 is a diagram illustrating a determination threshold map according to the first preferred embodiment of the present invention.

As shown in FIG. 5, when the boat 100 is in the high-speed state M1, the controller 40 controls the trim actuator 56a to change the orientation B of the deflector 56 from the orientation Bu1 to the orientation Bd3 based on the throttle opening deviation $\Delta TH$ entering into a condition corresponding to deceleration of the boat body 10. Specifically, the controller 40 detects, as $\Delta TH$, the deviation of the throttle opening A detected at a predetermined time interval (every several tens of milliseconds, for example). The controller 40 controls the trim actuator 56a to change the orientation B of the deflector 56 from the orientation Bu1 to the orientation Bd3 based on the throttle opening deviation $\Delta TH$ being less than a deceleration determination threshold DTH ($\Delta TH<DTH$) continuously for a deceleration determination period T1 as the condition corresponding to deceleration of the boat body 10. For example, the deceleration determination period T1 is several seconds. The orientation B of the deflector 56 is changed from the orientation Bu1 to the orientation Bd3 such that the trim angle $\theta$ of the boat body 10 is decreased. A value less than the deceleration determination threshold DTH is an example of a "value corresponding to deceleration of the boat body". The deceleration determination period T1 is an example of a "first period" of time.

When the boat 100 turns, the high-speed state M1 is changed to the deceleration state M2 before a time (a time t3 in FIG. 10, for example) at which the boat 100 turns. That is, the controller 40 controls the operation of the trim actuator 56a to change the orientation B of the deflector 56 from the orientation Bu1 to the orientation Bd3 (at a time t2) based on $\Delta TH$ being less than the deceleration determination threshold DTH continuously for the deceleration determination period T1 from a time (a time t1 in FIG. 10) before turning of the boat body 10.

The controller 40 is configured or programmed to set the deceleration determination threshold DTH to a larger value as the engine rotational speed Ne is higher. For example, the controller 40 is configured or programmed to set the deceleration determination period T1 to a larger value as the engine rotational speed Ne is higher. For example, the controller 40 sets the deceleration determination period T1 corresponding to the engine rotational speed Ne by referring to the determination period map 41b shown in FIG. 6. The controller 40 sets the deceleration determination threshold DTH corresponding to the engine rotational speed Ne by referring to the determination threshold map 41c shown in FIG. 7. For example, in the determination threshold map 41c, as the engine rotational speed Ne is higher, the amount of increase in the deceleration determination threshold DHT is larger.

As shown in FIG. 5, the controller 40 controls the operation of the trim actuator 56a to change (return) the orientation B of the deflector 56 from the orientation Bd3 to the orientation Bu1 based on the throttle opening deviation $\Delta TH$ entering into a condition corresponding to acceleration of the boat body 10 (a condition corresponding to stopping deceleration of the boat body 10) when having operated the trim actuator 56a to change the orientation B of the deflector 56 from the orientation Bu1 to the orientation Bd3. Specifically, the controller 40 controls the trim actuator 56a to change the orientation B of the deflector 56 from the orientation Bd3 to the orientation Bu1 based on the throttle opening deviation $\Delta TH$ being equal to or more than an acceleration determination threshold $\Delta TH$ ($\Delta TH \geq ATH$) continuously for an acceleration determination period T2 as the condition corresponding to acceleration of the boat body 10 (the condition corresponding to stopping deceleration of the boat body 10). For example, the acceleration determination period T2 is set to the same length of time (a value obtained by referring to the determination threshold map 41c) as the deceleration determination period T1. Furthermore, the acceleration determination threshold ATH is set to the same value (a value obtained by referring to the determination period map 41b) as the deceleration determination threshold DTH. The orientation B of the deflector 56 is changed from the orientation Bd3 to the orientation Bu1 such that the trim angle θ of the boat body 10 is increased. The acceleration determination period T2 is an example of a "third period" of time. A value equal to or more than the acceleration determination threshold ATH is an example of a "value corresponding to acceleration of the boat body".

When the boat 100 turns, the deceleration state M2 is changed to the high-speed state M1 after a period during which the boat 100 is turning. That is, the controller 40 controls the operation of the trim actuator 56a to change the orientation B of the deflector 56 from the orientation Bd3 to the orientation Bu1 (at a time t7 in FIG. 10) based on ΔTH being equal to or more than the acceleration determination threshold ATH continuously for the acceleration determination period T2 after a time at which turning of the boat body 10 is completed (a time t6 in FIG. 10, for example).

As shown in FIG. 5, the controller 40 is configured or programmed to perform a control to perform a filtering process on the engine rotational speed Ne in the deceleration state M2. For example, the controller 40 performs a process of acquiring a moving average value as the filtering process on the engine rotational speed Ne detected by the engine rotational speed sensor 24. Thus, the engine rotational speed Ne is smoothed in time series. The controller 40 controls the trim actuator 56a so as to change the orientation B of the deflector 56 from the orientation Bd3 to the orientation Bd2 based on the engine rotational speed Ne (moving average value) being less than a low-speed determination threshold LNe (Ne<LNe) continuously for a low-speed determination period T3 after the filtering process. The orientation B of the deflector 56 is changed from the orientation Bd3 to the orientation Bd2 such that the trim angle θ of the boat body 10 is increased. For example, the low-speed determination period T3 is a few seconds and is a constant period of time. The low-speed determination period T3 is an example of a "second period" of time. A value less than the low-speed determination threshold LNe is an example of a "value corresponding to the low-speed".

The controller 40 controls the trim actuator 56a to change the orientation B of the deflector 56 from the orientation Bd3 to the orientation Bd2 based on the engine 20 entering an idle state. Specifically, the controller 40 controls the trim actuator 56a to change the orientation B of the deflector 56 from the orientation Bd3 to the orientation Bd2 when the engine rotational speed Ne is a value within an idling rotational speed range RNe continuously for the low-speed determination period T3.

As shown in FIG. 5, the controller 40 controls the trim actuator 56a to change the orientation B of the deflector 56 from the orientation Bd2 to the orientation Bu1 based on the engine rotational speed Ne being equal to or more than a high-speed determination threshold HNe (Ne≥HNe) continuously for a high-speed determination period T4 after the filtering process. The high-speed determination period T4 is set as a period of time shorter than the low-speed determination period T3, for example. The high-speed determination threshold HNe is set to a value equal to the low-speed determination threshold LNe, for example. The value equal to or more than the high-speed determination threshold HNe is an example of a "value corresponding to the high-speed".

Figure 8:
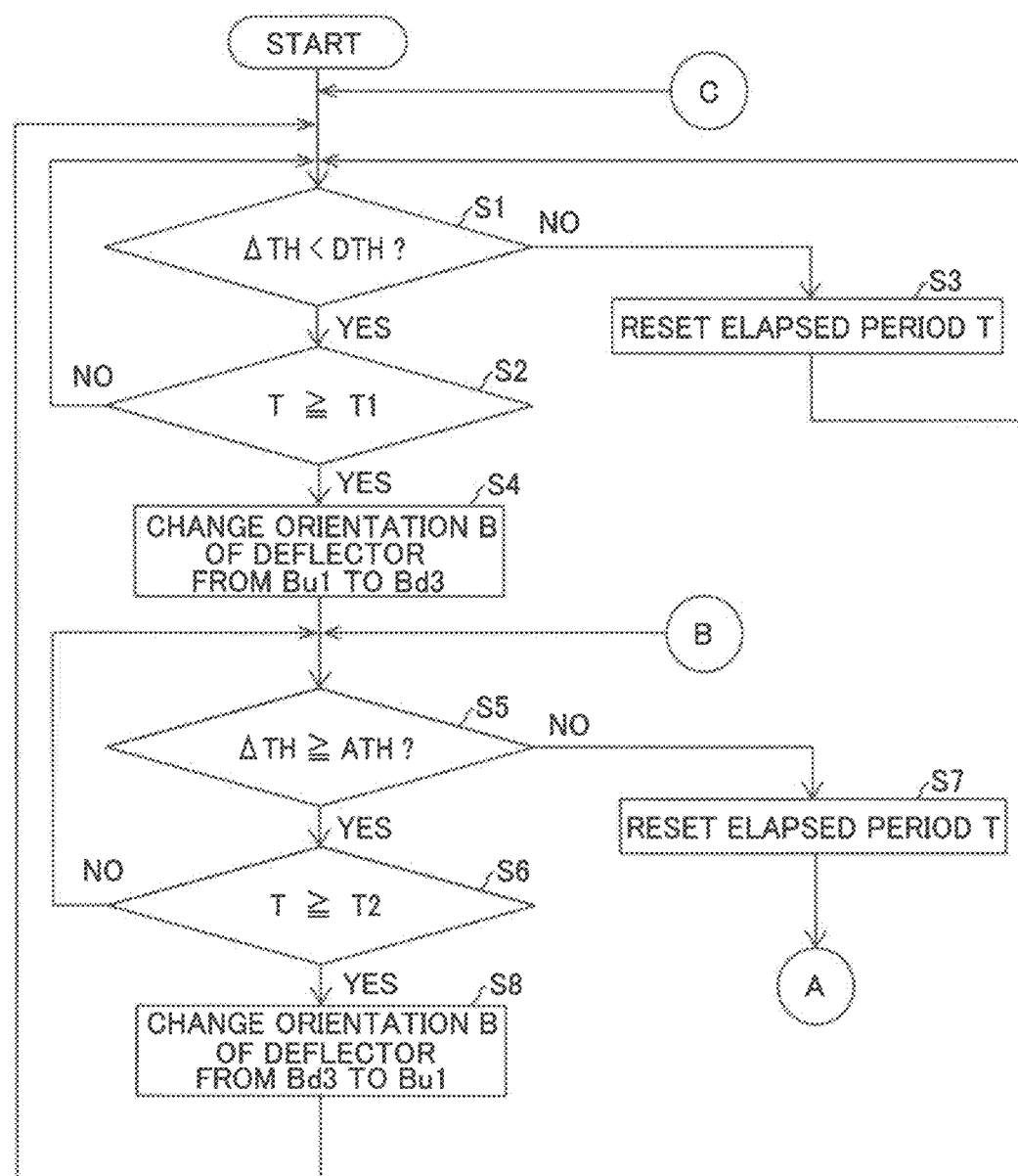
FIG. 8 is a flowchart showing a control process in the boat according to the first preferred embodiment of the present invention.
Figure 9:
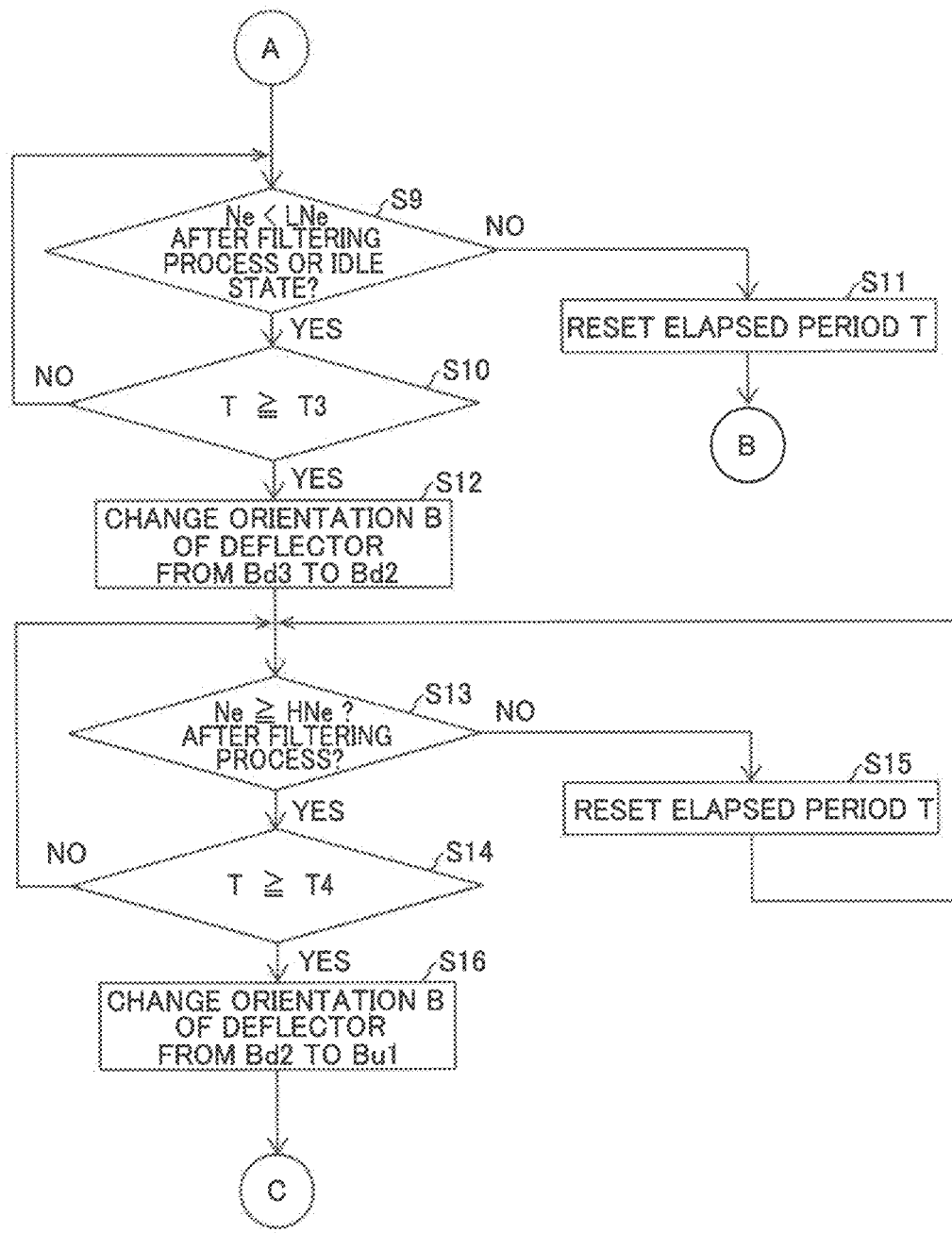
FIG. 9 is a flowchart showing the control process in the boat according to the first preferred embodiment of the present invention.

A trim angle control method for the boat 100 according to the first preferred embodiment is now described with reference to FIGS. 1 to 9. FIGS. 8 and 9 are flowcharts showing a control process in the boat 100. In the control process described below, step S1 is performed when the boat 100 is in the high-speed state M1.

As shown in FIG. 8, in step S1, it is determined whether or not the throttle opening deviation ΔTH is less than the deceleration determination threshold DTH. When the throttle opening deviation ΔTH is less than the deceleration determination threshold DTH, the process advances to step S2. When the throttle opening deviation ΔTH is equal to or more than the deceleration determination threshold DTH, the process advances to step S3.

In step S2, it is determined whether or not the throttle opening deviation ΔTH is less than the deceleration determination threshold DTH continuously for the deceleration determination period T1. That is, it is determined whether or not the boat 100 is in the deceleration state M2. For example, it is determined whether or not an elapsed period T from a time at which the throttle opening deviation ΔTH becomes less than the deceleration determination threshold DTH is equal to or longer than the deceleration determination period T1. When the elapsed period T is equal to or longer than the deceleration determination period T1, the process advances to step S4, and when the elapsed period T is shorter than the deceleration determination period T1, the process returns to step S1.

In step S3, the elapsed period T is reset. Then, the process returns to step S1.

In step S4, the orientation B of the deflector 56 is changed from the orientation Bu1 to the orientation Bd3. Specifically, the operation of the trim actuator 56a is controlled such that the orientation B of the deflector 56 is changed from the orientation Bu1 to the orientation Bd3, and the trim angle θ of the boat body 10 is decreased. Then, the process advances to step S5.

In step S5, it is determined whether or not the throttle opening deviation ΔTH is equal to or more than the acceleration determination threshold ATH. When the throttle opening deviation ΔTH is equal to or more than the acceleration determination threshold ATH, the process advances to step S6, and when the throttle opening deviation ΔTH is less than the acceleration determination threshold ATH, the process advances to step S7.

In step S6, it is determined whether or not the throttle opening deviation ΔTH is equal to or more than the acceleration determination threshold ATH continuously for the acceleration determination period T2. That is, it is determined whether or not the boat 100 is in the high-speed state M1. For example, it is determined whether or not an elapsed period T from a time at which the throttle opening deviation ΔTH becomes equal to or more than the acceleration determination threshold ATH is equal to or longer than the acceleration determination period T2. When the elapsed period T is equal to or longer than the acceleration determination period T2, the process advances to step S8, and when the elapsed period T is shorter than the acceleration determination period T2, the process returns to step S5.

In step S7, the elapsed period T is reset. Then, the process advances to step S9.

In step S8, the orientation B of the deflector 56 is changed from the orientation Bd3 to the orientation Bu1. Then, the process returns to step S1.

As shown in FIG. 9, in step S9, it is determined whether or not the engine rotational speed Ne is less than the low-speed determination threshold LNe after the filtering process, or the engine 20 is in the idle state (the engine rotational speed Ne is within the idling rotational speed range RNe). Note that the "engine rotational speed Ne" described below refers to an "engine rotational speed Ne after the filtering process". When the engine rotational speed Ne is less than the low-speed determination threshold LNe or when the engine 20 is in the idle state, the process advances to step S10. When the engine rotational speed Ne is equal to or more than the low-speed determination threshold LNe and the engine 20 is not in the idle state, the process advances to step S11.

In step S10, it is determined whether or not the engine rotational speed Ne is less than the low-speed determination threshold LNe continuously for the low-speed determination period T3. That is, it is determined whether or not the boat 100 is in the low-speed state M3. For example, it is determined whether or not an elapsed period T from a time at which the engine rotational speed Ne becomes less than the low-speed determination threshold LNe is equal to or longer than the low-speed determination period T3. When the elapsed period T is equal to or longer than the low-speed determination period T3, the process advances to step S12, and when the elapsed period T is shorter than the acceleration determination period T2, the process returns to step S9.

In step S11, the elapsed period T is reset. Then, the process returns to step S5.

In step S12, the orientation B of the deflector 56 is changed from the orientation Bd3 to the orientation Bd2. Then, the process advances to step S13.

In step S13, it is determined whether or not the engine rotational speed Ne is equal to or more than the high-speed determination threshold HNe. When the engine rotational speed Ne is equal to or more than the high-speed determination threshold HNe, the process advances to step S14, and when the engine rotational speed Ne is less than the high-speed determination threshold HNe, the process advances to step S15.

In step S14, it is determined whether or not the engine rotational speed Ne is equal to or more than the high-speed determination threshold HNe continuously for the high-speed determination period T4. That is, it is determined whether or not the boat 100 is in the high-speed state M1. For example, it is determined whether or not an elapsed period T from a time at which the engine rotational speed Ne becomes equal to or more than the high-speed determination threshold HNe is equal to or longer than the high-speed determination period T4. When the elapsed period T is equal to or longer than the high-speed determination period T4, the process advances to step S16, and when the elapsed period T is shorter than the high-speed determination period T4, the process returns to step S13.

In step S15, the elapsed period T is reset. Then, the process returns to step S13.

In step S16, the orientation B of the deflector 56 is changed from the orientation Bd2 to the orientation Bu1. Then, the process returns to step S1.

A specific example of the trim angle control method for the boat 100 according to the first preferred embodiment is now described with reference to FIGS. 10 and 11.

Figure 10:
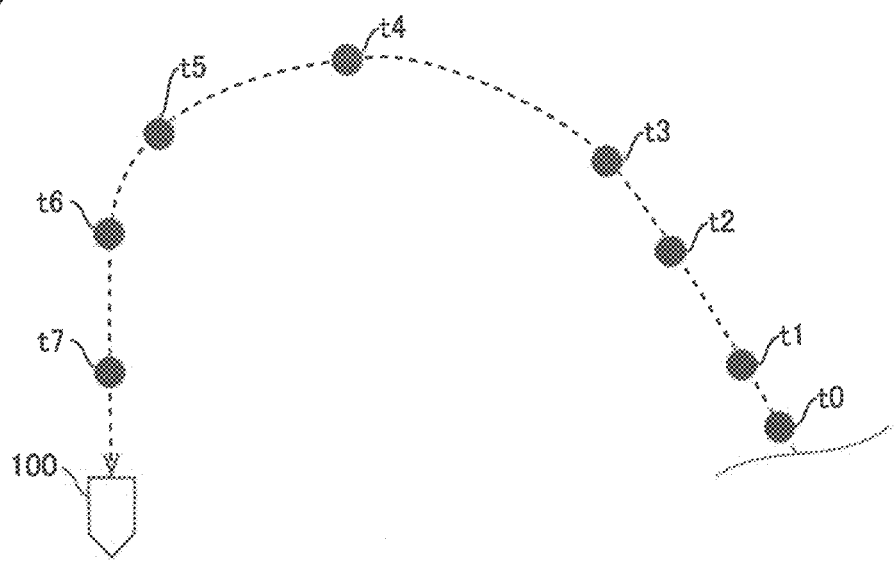
FIG. 10 is a schematic view showing a first specific example of the control process in the boat according to the first preferred embodiment of the present invention.

As shown in FIG. 10, at a time t0, the boat 100 is traveling in the high-speed state M1. Then, at the time t1, the throttle operator 63 is operated to reduce the throttle opening A, and the throttle opening deviation ΔTH becomes less than the deceleration determination threshold DTH. Thus, at the time t2, which is a time at which the deceleration determination period T1 has elapsed from the time t1, the engine rotational speed Ne becomes lower than that at the time t1. That is, at the time t2, the boat 100 is traveling in the deceleration state M2. Then, at the time t2, the orientation B of the deflector 56 is changed from the orientation Bu1 to the orientation Bd3, and the trim angle θ of the boat body 10 is decreased.

Then, at the time t3, the steering shaft 65 is rotated in a turning direction, and the boat 100 starts to turn. Then, at a time t4, the throttle operator 63 is operated to fully open the throttle opening A. Then, at a time t5, the throttle opening deviation ΔTH becomes equal to or more than the acceleration determination threshold ATH. Then, at the time t6, the steering shaft 65 is rotated to a neutral position, and turning of the boat 100 is completed. At the time t6, the throttle opening A is fully opened.

Then, at the time t7, which is a time at which the acceleration determination period T2 has elapsed from the time t5, the engine rotational speed Ne becomes higher than that at the time t5. That is, at the time t7, the boat 100 is traveling in the high-speed state M1. Then, at the time t7, the orientation B of the deflector 56 is changed from the orientation Bd2 to the orientation Bu1, and the trim angle θ of the boat body 10 is increased.

Figure 11:
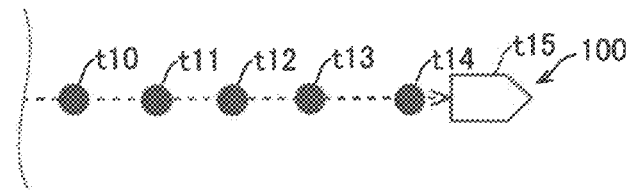
FIG. 11 is a schematic view showing a second specific example of the control process in the boat according to the first preferred embodiment of the present invention.

As shown in FIG. 11, at a time t10, the boat 100 is in the low-speed state M3. Then, at a time t11, the throttle operator 63 is operated to increase the throttle opening A, and the engine rotational speed Ne becomes equal to or more than the high-speed determination threshold HNe. Then, at a time t12 at which the high-speed determination period T4 has elapsed from the time t11, the orientation B of the deflector 56 is changed from the orientation Bd2 to the orientation Bu1, and the trim angle θ of the boat body 10 is increased.

Then, at a time t13, the high-speed state M1 is changed to the deceleration state M2, the orientation B of the deflector 56 is changed from the orientation Bu1 to the orientation Bd3, and the trim angle θ of the boat body 10 is decreased. Then, at a time t14, the engine rotational speed Ne becomes less than the low-speed determination threshold LHe, or the engine 20 enters the idle state. Then, at a time t15 at which the low-speed determination period T3 has elapsed from the time t14, the boat 100 enters the low-speed state M3, and the orientation B of the deflector 56 is changed from the orientation Bd3 to the orientation Bd2.

In the structure of the boat 100 according to the first preferred embodiment of the present invention, the following advantageous effects are achieved.

According to the first preferred embodiment of the present invention, the controller 40 is configured or programmed to control the operation of the trim actuator 56a based on the throttle opening deviation ΔTH. Accordingly, the trim angle of the boat body 10 is automatically controlled without newly providing a steering angle sensor in the steering unit 60. Consequently, the trim angle θ of the boat body 10 is automatically controlled while a complex structure of the boat 100 is significantly reduced or prevented.

According to the first preferred embodiment of the present invention, the controller 40 is configured or programmed to control the operation of the trim actuator 56a based on the throttle opening deviation ΔTH such that the trim angle θ of the boat 100 is controlled based on a change (acceleration or deceleration) in the boat speed. Accordingly, the trim angle θ of the boat 100 is controlled based on deceleration of the boat 100 before the start of turning of the boat 100, for example. Consequently, the trim angle θ is decreased before the boat 100 starts to turn, and thus the trim angle θ of the boat 100 is sufficiently reduced at a time at which the boat 100 starts to turn. Thus, the boat 100 starts to turn in a state in which a contact area between the boat body 10 (hull 12) and the water surface W is relatively large, and thus the water contact resistance of the boat 100 is increased, and an increase in the turning diameter of the boat 100 (an increase in the time required for the boat 100 to turn) is significantly reduced or prevented.

According to the first preferred embodiment of the present invention, the controller 40 is configured or programmed to acquire the throttle opening deviation ΔTH and control the operation of the trim actuator 56a based on the throttle opening deviation ΔTH. Accordingly, the existing throttle opening sensor 25 is able to be used, and thus the trim angle θ of the boat body 10 is automatically controlled without newly providing a steering angle sensor in the steering unit 60.

According to the first preferred embodiment of the present invention, the controller 40 is configured or programmed to control the operation of the trim actuator 56a so as to change the orientation B of the deflector 56 to the orientation Bd3 based on the throttle opening deviation ΔTH entering into the condition corresponding to deceleration of the boat body 10. Accordingly, before the boat 100 turns, the orientation B of the deflector 56 is changed to the orientation Bd3 based on deceleration of the boat body 10 occurring before turning of the boat 100. Consequently, an increase in the turning diameter of the boat 100 (an increase in the time required for the boat 100 to turn) is effectively significantly reduced or prevented.

According to the first preferred embodiment of the present invention, the controller 40 is configured or programmed to control the operation of the trim actuator 56a so as to change the orientation B of the deflector 56 from the orientation Bd3 to the orientation Bu1 based on the throttle opening deviation ΔTH entering into the condition corresponding to stopping deceleration of the boat body 10 when operating the trim actuator 56a to change the orientation B of the deflector 56 to the orientation Bd3. Accordingly, the orientation B of the deflector 56 is changed to the orientation Bu1 when the boat 100 starts to accelerate while turning, and thus the boat 100 more quickly accelerates after decelerating and then accelerating.

According to the first preferred embodiment of the present invention, the controller 40 is configured or programmed to control the operation of the trim actuator 56a so as to change the orientation B of the deflector 56 to the orientation Bd3 based on the throttle opening deviation ΔTH being less than the deceleration determination threshold DTH continuously for the deceleration determination period T1 as the condition corresponding to deceleration of the boat body 10. Accordingly, the orientation B of the deflector 56 is changed to the orientation Bd3 at a more appropriate time than a time at which the boat body 10 decelerates. In addition, the orientation B of the deflector 56 is not changed until the deceleration determination period T1 elapses, and thus a frequent change in the orientation B of the deflector 56 (the occurrence of chattering) is significantly reduced or prevented.

According to the first preferred embodiment of the present invention, the controller 40 is configured or programmed to control the operation of the trim actuator 56a so as to change the orientation B of the deflector 56 to the orientation Bd3 based on the throttle opening deviation ΔTH being less than the deceleration determination threshold DTH continuously for the deceleration determination period T1 from the time before turning of the boat body 10 as the condition corresponding to deceleration of the boat body 10. Accordingly, the orientation B of the deflector 56 is changed to the orientation Bd3 at a more appropriate time (at a time at which the deceleration determination period T1 has elapsed) after the time at which the boat body 10 decelerates. Furthermore, the orientation of the deflector 56 is not changed until the deceleration determination period T1 elapses after the deceleration, and thus a frequent change in the orientation of the deflector 56 (the occurrence of chattering) is significantly reduced or prevented.

According to the first preferred embodiment of the present invention, the controller 40 is configured or programmed to control the operation of the trim actuator 56a so as to change the orientation B of the deflector 56 to the orientation Bd3 when the engine rotational speed Ne is equal to or more than the high-speed determination threshold HNe and the throttle opening deviation ΔTH enters into the condition corresponding to deceleration of the boat body 10. Accordingly, when the turning diameter is likely to be relatively large, the trim angle θ is effectively controlled so as to significantly reduce or prevent an increase in the turning diameter.

According to the first preferred embodiment of the present invention, the controller 40 is configured or programmed to control the operation of the trim actuator 56a so as to change the orientation B of the deflector 56 from the orientation Bd3 to the orientation Bd2 based on the engine rotational speed Ne becoming the low-speed determination threshold LNe or the engine 20 entering the idle state when operating the trim actuator 56a to change the orientation B of the deflector 56 to the orientation Bd3. Accordingly, the orientation B of the deflector 56 is changed to the orientation Bd2 different from the orientation Bd3 when the boat 100 is traveling at a low speed or when the boat 100 is stopped. Consequently, the orientation B of the deflector 56 is controlled such that the trim angle θ is appropriate even when the boat 100 is traveling at a low speed or when the boat 100 is stopped.

According to the first preferred embodiment of the present invention, the controller 40 is configured or programmed to control the operation of the trim actuator 56a so as to change the orientation B of the deflector 56 from the orientation Bd3 to the orientation Bd2 based on the engine rotational speed Ne being the low-speed determination threshold LNe continuously for the low-speed determination period T3 or the engine 20 being in the idle state continuously for the low-speed determination period T3 when operating the trim actuator 56a to change the orientation B of the deflector 56 to the orientation Bd3. Accordingly, the orientation B of the deflector 56 is not immediately changed in response to the engine rotational speed Ne becoming the low-speed determination threshold LNe or the engine 20 entering the idle state. Consequently, when the boat 100 decelerates and then accelerates, the deflector 56 is oriented in an appropriate orientation. In addition, the orientation B of the deflector 56 is not changed until the low-speed determination period T3 elapses, and thus a frequent change in the orientation B of the deflector 56 (the occurrence of chattering) is significantly reduced or prevented.

According to the first preferred embodiment of the present invention, the controller 40 is configured or programmed to control the operation of the trim actuator 56a so as to change the orientation B of the deflector 56 to the orientation Bu1 based on the throttle opening deviation ΔTH entering into the condition corresponding to acceleration of the boat body 10. Accordingly, the trim angle θ of the boat body 10 is easily changed to the trim angle θ of the boat body 10 suitable for when the boat 100 accelerates. Consequently, when the boat 100 accelerates after turning, for example, the trim angle θ of the boat body 10 is appropriately and automatically controlled.

According to the first preferred embodiment of the present invention, the controller 40 is configured or programmed to control the operation of the trim actuator 56a so as to change the orientation B of the deflector 56 to the orientation Bu1 based on the throttle opening deviation ΔTH being equal to or more than the acceleration determination threshold ATH continuously for the acceleration determination period T2 as the condition corresponding to acceleration of the boat body 10. Accordingly, the orientation B of the deflector 56 is changed to the orientation Bu1 after the boat 100 starts to accelerate and the acceleration determination period T2 elapses. Consequently, the trim angle θ of the boat body 10 is automatically controlled to be suitable for acceleration while an increase in the turning diameter is significantly reduced or prevented. Furthermore, the orientation B of the deflector 56 is not changed until the acceleration determination period T2 elapses, and thus a frequent change in the orientation B of the deflector 56 (the occurrence of chattering) is significantly reduced or prevented.

According to the first preferred embodiment of the present invention, the controller 40 is configured or programmed to control the operation of the trim actuator 56a so as to change the orientation B of the deflector 56 to the orientation Bu1 based on the throttle opening deviation ΔTH being equal to or more than the acceleration determination threshold ATH continuously for the acceleration determination period T2 after turning of the boat body 10 is completed as the condition corresponding to acceleration of the boat body 10. Accordingly, the orientation B of the deflector 56 is changed to the orientation Bu1 after turning of the boat body 10 is completed and the acceleration determination period T2 elapses from the time at which the acceleration is started, and thus an increase in the turning diameter due to a change in the orientation B of the deflector 56 during turning of the boat body 10 is significantly reduced or prevented.

According to the first preferred embodiment of the present invention, the controller 40 is configured or programmed to control the operation of the trim actuator 56a so as to change the orientation B of the deflector 56 to the orientation Bd3 based on the throttle opening deviation ΔTH entering into the condition corresponding to deceleration of the boat body 10. Furthermore, the controller 40 is configured or programmed to control the operation of the trim actuator 56a so as to change the orientation B of the deflector 56 to the orientation Bu1 based on the throttle opening deviation ΔTH entering into the condition corresponding to acceleration of the boat body 10 when operating the trim actuator 56a to change the orientation B of the deflector 56 to the orientation Bd3. Accordingly, the orientation B of the deflector 56 is changed to the orientation B of the deflector 56 suitable for when the boat 100 decelerates and then accelerates. Consequently, when the boat 100 decelerates and then accelerates to turn, for example, the orientation B of the deflector 56 is changed to an appropriate orientation from the start of turning to the end of turning.

According to the first preferred embodiment of the present invention, the controller 40 is configured or programmed to control the operation of the trim actuator 56a based on the engine rotational speed Ne and the throttle opening deviation ΔTH so as to change the orientation B of the deflector 56 to an orientation corresponding to any one of the high-speed state M1 in which the boat speed is high, the deceleration state M2 in which the boat speed is reducing from a high speed, and the low-speed state M3 in which the boat speed is low. Accordingly, the orientation B of the deflector 56 is changed to an appropriate orientation for the high-speed state M1, the deceleration state M2, or the low-speed state M3.

According to the first preferred embodiment of the present invention, the controller 40 is configured or programmed to control the operation of the trim actuator 56a so as to change the orientation B of the deflector 56 from the orientation Bu1 corresponding to the high-speed state M1 to the orientation Bd3 corresponding to the deceleration state M2 based on the throttle opening A of the engine 20 entering into the condition corresponding to deceleration of the boat body 10 as the throttle opening deviation ΔTH in the high-speed state M1. Accordingly, the throttle opening A of the engine 20 is acquired such that a change from the high-speed state M1 to the deceleration state M2 is easily detected.

According to the first preferred embodiment of the present invention, the controller 40 is configured or programmed to perform a control to perform the filtering process on the engine rotational speed Ne in the deceleration state M2. Furthermore, the controller 40 is configured or programmed to control the operation of the trim actuator 56a so as to change the orientation B of the deflector 56 from the orientation Bd3 corresponding to the low-speed state M3 to the orientation Bu1 corresponding to the high-speed state M1 based on the engine rotational speed Ne becoming the high-speed determination threshold HNe after the filtering process. Accordingly, the filtering process is performed on the engine rotational speed Ne such that unnecessary frequency components are removed from information about the engine rotational speed Ne. Consequently, an erroneous change of the orientation B of the deflector 56 to the orientation Bu1 corresponding to the high-speed state M1 based on a value of the rotational speed of the engine 20 that varies instantaneously due to unnecessary frequency components such as noise is significantly reduced or prevented.

According to the first preferred embodiment of the present invention, the orientation Bu1 corresponding to the high-speed state M1 is set as the orientation B of the deflector 56 directed upward relative to the orientation Bd2 corresponding to the low-speed state M3. Furthermore, the orientation Bd3 corresponding to the deceleration state M2 is set as the orientation B of the deflector 56 directed downward relative to the orientation Bu1 corresponding to the high-speed state M1. In addition, the orientation Bd2 corresponding to the low-speed state M3 is set as the orientation B of the deflector 56 directed upward relative to the orientation Bd3 corresponding to the deceleration state M2. Accordingly, the trim angle θ of the boat body 10 is larger in the high-speed state M1 than that in the low-speed state M3, and thus the water contact resistance of the boat body 10 is decreased. Furthermore, in the deceleration state M2, the trim angle θ is smaller than that in the high-speed state M1, and thus an increase in attitude change that occurs during deceleration is significantly reduced or prevented. In the low-speed state M3, the trim angle θ is larger than that in the deceleration state M2, and thus an excessive reduction in the trim angle θ is significantly reduced or prevented in the low-speed state M3.

In the trim angle control method according to the first preferred embodiment of the present invention, the following advantageous effects are achieved.

According to the first preferred embodiment of the present invention, the trim angle control method for the boat 100 as described above enables the trim angle θ of the boat body 10 to be automatically controlled while a complex structure is significantly reduced or prevented, similarly to the structure of the boat 100 described above.

Second Preferred Embodiment

The structure of a boat 200 according to a second preferred embodiment of the present invention is now described with reference to FIGS. 12 and 13. In the second preferred embodiment, the orientation B of a deflector 56 is changed based on a displacement dTH of a throttle opening A, unlike the first preferred embodiment in which the orientation B of the deflector 56 is changed based on the engine rotational speed Ne and the throttle opening deviation ΔTH. In the second preferred embodiment, the same or similar structures as those of the first preferred embodiment are denoted by the same reference numerals, and description thereof is omitted.

Figure 12:
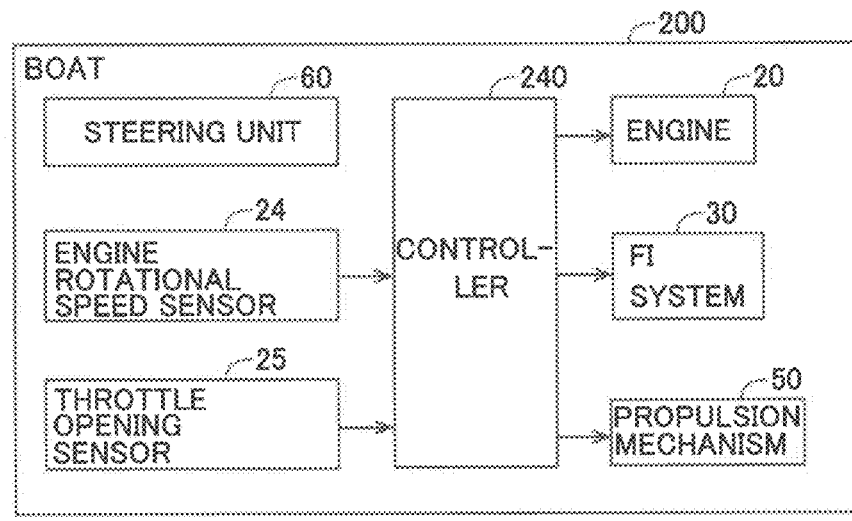
FIG. 12 is a block diagram showing the structure of a boat according to a second preferred embodiment of the present invention.
Figure 13:
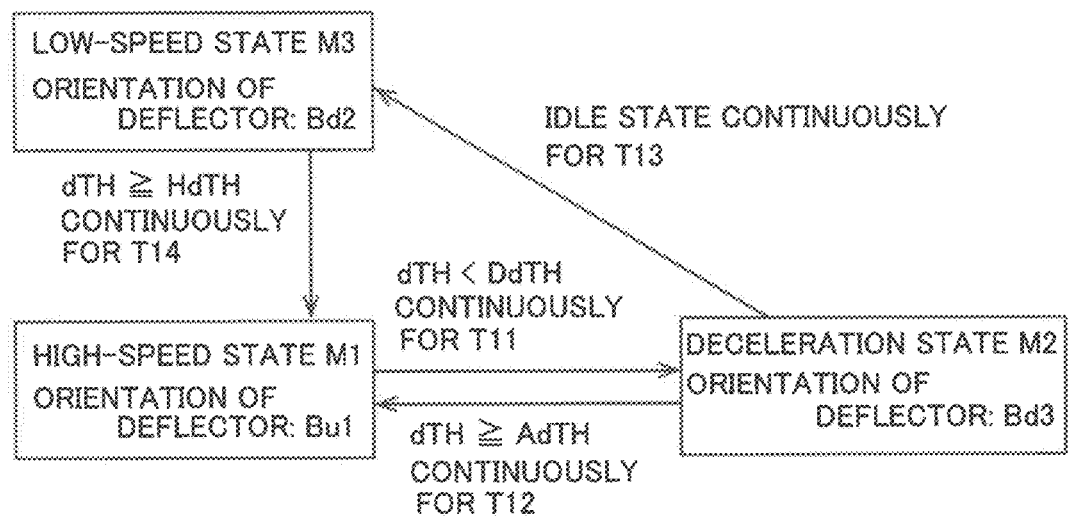
FIG. 13 is a diagram illustrating a change in the orientation of a deflector according to the second preferred embodiment of the present invention.

In the second preferred embodiment, as shown in FIG. 12, the boat 200 includes a controller 240. As shown in FIG. 13, the controller 240 is configured or programmed to control the operation of a trim actuator 56a so as to change the orientation B of the deflector 56 from an orientation Bu1 to an orientation Bd3 when the displacement dTH of the throttle opening A is less than a deceleration determination threshold DdTH continuously for a deceleration determination period T11 in a high-speed state M1.

The controller 240 is configured or programmed to control the operation of the trim actuator 56a so as to change the orientation B of the deflector 56 from the orientation Bd3 to the orientation Bu1 when the displacement dTH of the throttle opening A is equal to or more than an acceleration determination threshold AdTH continuously for an acceleration determination period T12 in a deceleration state M2. Furthermore, the controller 240 is configured or programmed to control the operation of the trim actuator 56a so as to change the orientation B of the deflector 56 from the orientation Bd3 to an orientation Bd2 when an engine 20 is in an idle state continuously for a low-speed determination period T13 in the deceleration state M2.

The controller 240 is configured or programmed to control the operation of the trim actuator 56a so as to change the orientation B of the deflector 56 from the orientation Bd2 to the orientation Bu1 when the displacement dTH of the throttle opening A is equal to or more than a high-speed determination threshold HdTH continuously for a high-speed determination period T14 in a low-speed state M3. The remaining structures of the second preferred embodiment are similar to those of the first preferred embodiment.

In the structure of the boat 200 according to the second preferred embodiment of the present invention, the following advantageous effects are achieved.

According to the second preferred embodiment of the present invention, the controller 240 is configured or programmed to change the orientation B of the deflector 56 based on the displacement dTH of the throttle opening A. Accordingly, unlike the first preferred embodiment in which the orientation B of the deflector 56 is changed based on the engine rotational speed Ne and the throttle opening deviation ΔTH, it is not necessary to refer to an engine rotational speed Ne, and thus a control process is simplified. The remaining advantageous effects of the second preferred embodiment are similar to those of the first preferred embodiment.

Third Preferred Embodiment

The structure of a boat 300 according to a third preferred embodiment of the present invention is now described with reference to FIGS. 14 and 15. In the third preferred embodiment, the orientation B of a deflector 56 is changed based on an engine rotational speed Ne and the amount of change dNe in the engine rotational speed Ne, unlike the first preferred embodiment in which the orientation B of the deflector 56 is changed based on the engine rotational speed Ne and the throttle opening deviation ΔTH. In the third preferred embodiment, the same or similar structures as those of the first preferred embodiment are denoted by the same reference numerals, and description thereof is omitted.

Figure 14:
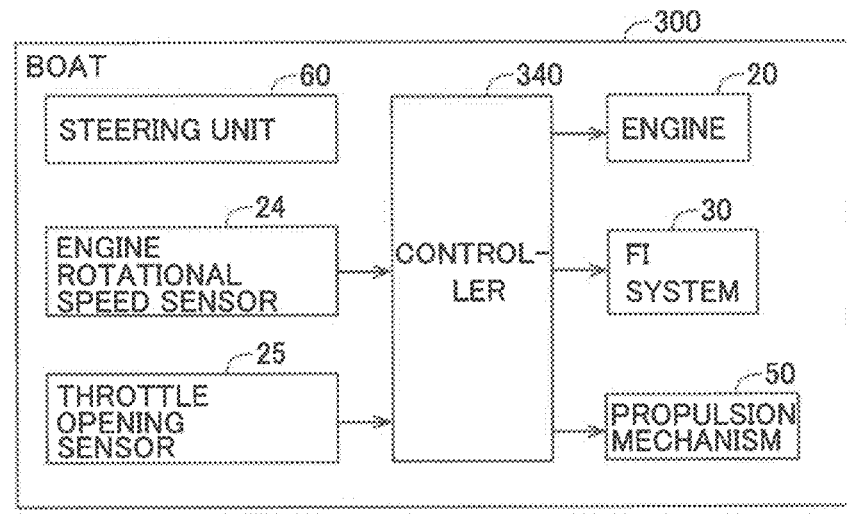
FIG. 14 is a block diagram showing the structure of a boat according to a third preferred embodiment of the present invention.
Figure 15:
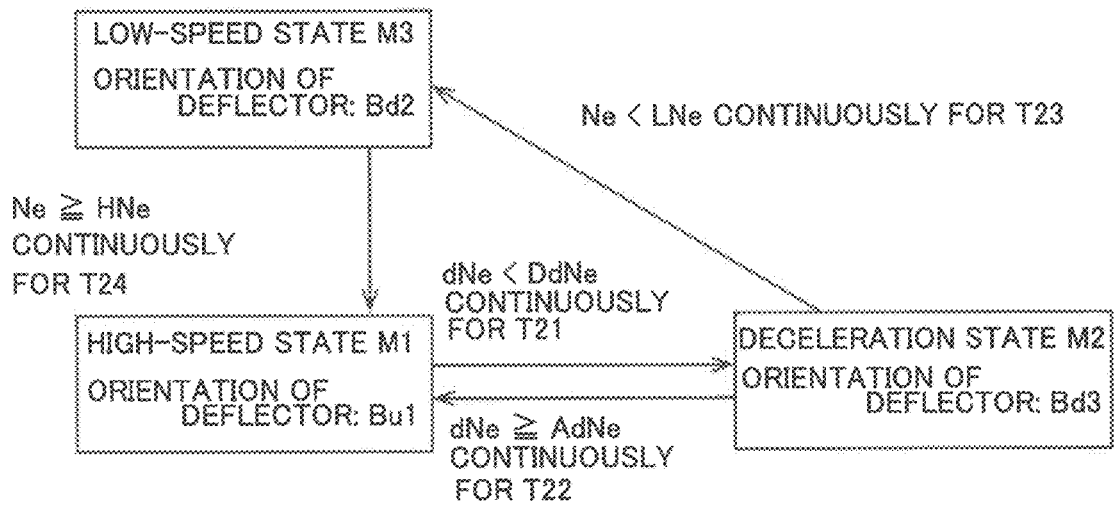
FIG. 15 is a diagram illustrating a change in the orientation of a deflector according to the third preferred embodiment of the present invention.

In the third preferred embodiment, as shown in FIG. 14, a boat 300 includes a controller 340. As shown in FIG. 15, the controller 340 is configured or programmed to control the operation of a trim actuator 56a so as to change the orientation B of the deflector 56 from an orientation Bu1 to an orientation Bd3 when the amount of change dNe in the engine rotational speed Ne is less than a deceleration determination threshold DdNe continuously for a deceleration determination period T21 in a high-speed state M1. The amount of change dNe in the engine rotational speed Ne is an example of a "value corresponding to a change in a boat speed".

The controller 340 is configured or programmed to control the operation of the trim actuator 56a so as to change the orientation B of the deflector 56 from the orientation Bd3 to the orientation Bu1 when the amount of change dNe in the engine rotational speed Ne is equal to or more than an acceleration determination threshold AdNe continuously for an acceleration determination period T22 in a deceleration state M2. Furthermore, the controller 340 is configured or programmed to control the operation of the trim actuator 56a so as to change the orientation B of the deflector 56 from the orientation Bd3 to the orientation Bd2 when the engine rotational speed Ne is less than a low-speed determination threshold LNe continuously for a low-speed determination period T23 in the deceleration state M2.

The controller 340 is configured or programmed to control the operation of the trim actuator 56a so as to change the orientation B of the deflector 56 from the orientation Bd2 to the orientation Bu1 when the engine rotational speed Ne is equal to or more than a high-speed determination threshold HNe continuously for a high-speed determination period T24 in a low-speed state M3. The remaining structures of the third preferred embodiment are similar to those of the first preferred embodiment.

According to the third preferred embodiment of the present invention, the following advantageous effects are achieved.

According to the third preferred embodiment of the present invention, the controller 340 is configured or programmed to change the orientation B of the deflector 56 based on the amount of change dNe in the engine rotational speed Ne. Accordingly, unlike the first preferred embodiment in which the orientation B of the deflector 56 is changed based on the engine rotational speed Ne and the throttle opening deviation ΔTH, it is not necessary to refer to the throttle opening deviation ΔTH, and thus a control process is simplified. The remaining advantageous effects of the third preferred embodiment are similar to those of the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

Figure 16:
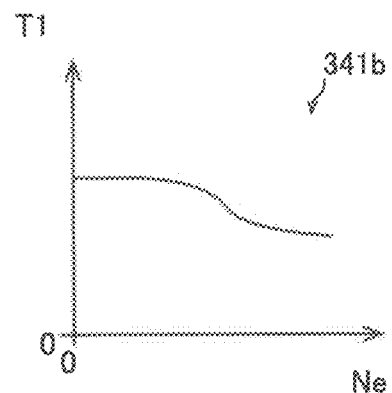
FIG. 16 is a diagram illustrating a determination time map according to a first modified example of the first to third preferred embodiments of the present invention.

For example, while in the determination period map, the deceleration determination period (acceleration determination period) is preferably longer as the engine rotational speed is higher in the first preferred embodiment described above, the present invention is not restricted to this. For example, as in a determination period map 341*b* according to a first modified example shown in FIG. 16, the deceleration determination period (acceleration determination period) may alternatively be shorter as the engine rotational speed Ne is higher.

Figure 17:
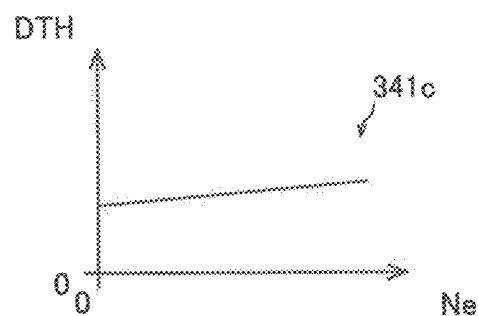
FIG. 17 is a diagram illustrating a determination threshold map according to a second modified example of the first to third preferred embodiments of the present invention.

While in the determination threshold map, the amount of increase in the deceleration determination threshold (acceleration determination threshold) is preferably larger as the engine rotational speed is higher in the first preferred embodiment described above, the present invention is not restricted to this. For example, as in a determination threshold map 341*c* according to a second modified example shown in FIG. 17, the amount of increase in the deceleration determination threshold (acceleration determination threshold) may not change.

While the propulsion mechanism is preferably a jet propulsion device in the first to third preferred embodiments described above, the present invention is not restricted to this. For example, the propulsion mechanism may alternatively be an outboard motor. In such a case, the boat may alternatively change the orientation of an outboard motor body as a trim changer in order to change the trim angle of the boat body.

While the orientation of the deflector as a deceleration orientation is preferably the orientation Bd3, the orientation of the deflector as an acceleration orientation is preferably the orientation Bu1, and the orientation of the deflector as a low-speed orientation is preferably the orientation Bd2 in the first to third preferred embodiments described above, the present invention is not restricted to this. For example, the orientation of the deflector as a deceleration orientation may alternatively be the orientation Bd2 or Bd1, the orientation of the deflector as an acceleration orientation may alternatively be the orientation Bu2, or the orientation of the deflector as a low-speed orientation may alternatively be the orientation Bd3 or Bd2.

While at least one of the amount of change in the engine rotational speed or the throttle opening (the deviation or the displacement) is preferably acquired as a value corresponding to a change in a boat speed in each of the first to third preferred embodiments described above, the present invention is not restricted to this. For example, when an existing accelerometer or state measurement sensor (IMU: inertial measurement unit) is installed in the boat, a value detected by the accelerometer or state measurement sensor may alternatively be acquired as a value corresponding to a change in a boat speed.

While the deceleration determination period, the acceleration determination period, the low-speed determination period, and the high-speed determination period are preferably provided in each of the first to third preferred embodiments described above, the present invention is not restricted to this. For example, the orientation of the deflector may alternatively be immediately changed based on the throttle opening (the deviation or the displacement) or the amount of change in the engine rotational speed without providing the deceleration determination period, the acceleration determination period, the low-speed determination period, and the high-speed determination period.

While the deceleration determination threshold, the acceleration determination threshold, the low-speed determination threshold, and the high-speed determination threshold are preferably provided in each of the first to third preferred embodiments described above, the present invention is not restricted to this. For example, the orientation of the deflector may alternatively be changed in proportion to the magnitude of the throttle opening (the deviation or the displacement) or the magnitude of the amount of change in the engine rotational speed without providing the deceleration determination threshold, the acceleration determination threshold, the low-speed determination threshold, and the high-speed determination threshold.

While the low-speed state is preferably not changed to the deceleration state and the high-speed state is preferably not changed to the low-speed state in each of the first to third preferred embodiments described above, the present invention is not restricted to this. For example, a change from the low-speed state to the deceleration state may alternatively be determined based on the engine rotational speed or the throttle opening (the deviation or the displacement), and the orientation of the deflector may alternatively be changed to an orientation corresponding to the deceleration state. Alternatively, a change from the high-speed state to the low-speed state may be determined based on the engine rotational speed or the throttle opening (the deviation or the displacement), and the orientation of the deflector may be changed to an orientation corresponding to the low-speed state.

While the process of acquiring the moving average value of the engine rotational speed is preferably used as an example of the filtering process in the first preferred embodiment described above, the present invention is not restricted to this. For example, a process of invalidating only a temporary sharp change in the engine rotational speed (a process of removing a high frequency) may alternatively be performed as the filtering process.

While the process operations performed by the controller are described using a flowchart in a flow-driven manner in which processes are performed in order along a process flow for the convenience of illustration in each of the first to third preferred embodiments described above, the present invention is not restricted to this. The process operations performed by the controller may alternatively be performed in an event-driven manner in which the processes are performed on an event basis. In this case, the process operations performed by the controller may be performed in a complete event-driven manner or in a combination of an event-driven manner and a flow-driven manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A boat comprising:
   an engine;
   a propulsion device to generate, by driving of the engine, a propulsive force to propel a boat body;
   a trim changer to change a trim angle of the boat body, the trim changer being changeable in incremental levels to a predetermined number of set orientations;
   a trim actuator to drive the trim changer; and
   a controller configured or programmed to control an operation of the trim actuator based on a value corresponding to a change in a boat speed per unit time to change the trim changer, in the incremental levels, to one of the predetermined number of set orientations.

2. The boat according to claim 1, wherein the controller is configured or programmed to acquire, as the value corresponding to the change in the boat speed per unit time, at least one of an amount of change in a rotational speed of the engine or a throttle opening of the engine, and to control the operation of the trim actuator based on at least one of the amount of change in the rotational speed of the engine or the throttle opening of the engine.

3. The boat according to claim 1, wherein the controller is configured or programmed to control the operation of the trim actuator so as to change an orientation of the trim changer to a deceleration orientation based on the value corresponding to the change in the boat speed per unit time entering into a condition corresponding to deceleration of the boat body.

4. The boat according to claim 3, wherein the controller is configured or programmed to control the operation of the trim actuator so as to change the orientation of the trim changer from the deceleration orientation to an acceleration orientation based on the value corresponding to the change in the boat speed per unit time entering into a condition corresponding to stopping of the deceleration of the boat body when operating the trim actuator to change the orientation of the trim actuator to the deceleration orientation.

5. The boat according to claim 3, wherein the controller is configured or programmed to control the operation of the trim actuator so as to change the orientation of the trim changer to the deceleration orientation based on the value corresponding to the change in the boat speed per unit time being a value corresponding to the deceleration of the boat body continuously for a first period of time as the condition corresponding to the deceleration of the boat body.

6. The boat according to claim 5, wherein the controller is configured or programmed to control the operation of the trim actuator so as to change the orientation of the trim changer to the deceleration orientation based on the value corresponding to the change in the boat speed per unit time being the value corresponding to the deceleration of the boat body continuously for the first period of time from a time before turning of the boat body as the condition corresponding to the deceleration of the boat body.

7. The boat according to claim 3, wherein the controller is configured or programmed to control the operation of the trim actuator so as to change the orientation of the trim changer to the deceleration orientation when a value corresponding to the boat speed is a value corresponding to a high speed and the value corresponding to the change in the boat speed per unit time enters into the condition corresponding to the deceleration of the boat body.

8. The boat according to claim 3, wherein the controller is configured or programmed to control the operation of the trim actuator so as to change the orientation of the trim changer from the deceleration orientation to a low-speed orientation based on a value corresponding to the boat speed becoming a value corresponding to a low speed or the engine entering an idle state when operating the trim actuator to change the orientation of the trim changer to the deceleration orientation.

9. The boat according to claim 8, wherein the controller is configured or programmed to control the operation of the trim actuator so as to change the orientation of the trim changer from the deceleration orientation to the low-speed orientation based on the value corresponding to the boat speed being the value corresponding to the low speed continuously for a second period of time or the engine being in the idle state continuously for the second period of time when operating the trim actuator to change the orientation of the trim changer to the deceleration orientation.

10. The boat according to claim 1, wherein the controller is configured or programmed to control the operation of the trim actuator so as to change an orientation of the trim changer to an acceleration orientation based on the value corresponding to the change in the boat speed per unit time entering into a condition corresponding to acceleration of the boat body.

11. The boat according to claim 10, wherein the controller is configured or programmed to control the operation of the trim actuator so as to change the orientation of the trim changer to the acceleration orientation based on the value corresponding to the change in the boat speed per unit time being a value corresponding to the acceleration of the boat body continuously for a third period of time as the condition corresponding to the acceleration of the boat body.

12. The boat according to claim 11, wherein the controller is configured or programmed to control the operation of the trim actuator so as to change the orientation of the trim changer to the acceleration orientation based on the value corresponding to the change in the boat speed per unit time being the value corresponding to the acceleration of the boat body continuously for the third period of time after turning of the boat body is completed as the condition corresponding to the acceleration of the boat body.

13. The boat according to claim 10, wherein the controller is configured or programmed to control the operation of the trim actuator so as to change the orientation of the trim changer to a deceleration orientation based on the value corresponding to the change in the boat speed per unit time entering into a condition corresponding to deceleration of the boat body, and to control the operation of the trim actuator so as to change the orientation of the trim changer to the acceleration orientation based on the value corresponding to the change in the boat speed per unit time entering into the condition corresponding to the acceleration of the boat body when operating the trim actuator to change the orientation of the trim changer to the deceleration orientation.

14. The boat according to claim 1, wherein the controller is configured or programmed to control the operation of the trim actuator based on a value corresponding to the boat speed and the value corresponding to the change in the boat speed per unit time so as to change an orientation of the trim changer to an orientation corresponding to any one of a high-speed state in which the boat speed is high, a deceleration state in which the boat speed is reducing from a high speed, and a low-speed state in which the boat speed is low.

15. The boat according to claim 14, wherein the controller is configured or programmed to control the operation of the trim actuator so as to change the orientation of the trim changer from the orientation corresponding to the high-speed state to the orientation corresponding to the deceleration state based on a throttle opening of the engine as the value corresponding to the change in the boat speed per unit time entering into a condition corresponding to deceleration of the boat body in the high-speed state.

16. The boat according to claim 14, wherein the controller is configured or programmed to perform a control to filter a rotational speed of the engine as the value corresponding to the boat speed in the deceleration state, and to control the operation of the trim actuator so as to change the orientation of the trim changer from the orientation corresponding to the low-speed state to the orientation corresponding to the high-speed state based on the rotational speed of the engine becoming a value corresponding to the high speed after the filtering of the rotational speed of the engine.

17. The boat according to claim 14, wherein
the orientation corresponding to the high-speed state is set as the orientation of the trim changer directed upward relative to the orientation corresponding to the low-speed state;
the orientation corresponding to the deceleration state is set as the orientation of the trim changer directed downward relative to the orientation corresponding to the high-speed state; and
the orientation corresponding to the low-speed state is set as the orientation of the trim changer directed upward relative to the orientation corresponding to the deceleration state.

18. A trim angle control method for a boat including a trim changer that changes a trim angle of a boat body and a trim actuator that drives the trim changer, the trim changer being changeable in incremental levels to a predetermined number of set orientations, the method comprising:
acquiring a value corresponding to a change in a boat speed per unit time; and
changing, in the incremental levels, the trim changer to one of the predetermined number of set orientations by controlling operation of the trim actuator based on the value corresponding to the change in the boat speed per unit time.

19. The trim angle control method for the boat according to claim 18, wherein
the acquiring of the value corresponding to the change in the boat speed per unit time includes acquiring at least one of an amount of change in a rotational speed of an engine or a throttle opening of the engine; and
the changing of the trim angle of the boat body includes controlling the operation of the trim actuator based on at least one of the amount of change in the rotational speed of the engine or the throttle opening of the engine.

20. The trim angle control method for the boat according to claim 18, wherein the changing of the trim angle of the boat body includes controlling the operation of the trim actuator so as to change an orientation of the trim changer to a deceleration orientation based on the value corresponding to the change in the boat speed per unit time entering into a condition corresponding to deceleration of the boat body.

* * * * *